United States Patent [19]

Peterson

[11] 4,158,434
[45] Jun. 19, 1979

[54] ELECTRONIC STATUS DETERMINING SYSTEM FOR GOODS

[76] Inventor: Glen Peterson, 540 S. 83rd E. Ave., Tulsa, Okla. 74112

[21] Appl. No.: 735,070

[22] Filed: Oct. 22, 1976

Related U.S. Application Data

[63] Continuation-in-part of Ser. No. 874,760, Nov. 7, 1969, Pat. No. 4,055,746.

[51] Int. Cl.$^2$ .................. G06K 5/00; G06K 19/06
[52] U.S. Cl. .................... 235/382; 235/493; 340/572
[58] Field of Search ............ 235/61, 7 R, 382, 380, 235/375; 340/258 R, 280; 365/87

[56] References Cited

U.S. PATENT DOCUMENTS

| | | | |
|---|---|---|---|
| 3,292,161 | 12/1966 | Broadbent | 340/174 QB |
| 3,465,317 | 9/1969 | Rabinow et al. | 360/1 |
| 3,508,219 | 4/1970 | Brownlow et al. | 340/174 JA |
| 3,577,136 | 5/1971 | Wolf | 340/280 |
| 3,631,442 | 12/1971 | Fearon | 340/280 |
| 3,651,503 | 3/1972 | Kono | 360/1 |
| 3,711,848 | 1/1973 | Martens | 340/280 |
| 3,810,147 | 5/1974 | Lichtblau | 340/258 R |

*Primary Examiner*—Daryl W. Cook

[57] ABSTRACT

An activatable, and deactivatable ferromagnetic memory label of broad application in tagging objects to permit selective detection of tagged objects depending upon the activation state of the label. The label comprises a thin, layered structure of any size and shape having a central layer of ferromagnetic substance sandwiched between two thin non-magnetic covers. The activated state is derived by producing a multiplicity of magnetically saturated lines, or grooves, in the ferromagnetic substance, each of which is magnetically biased to receive and momentarily store radiant energy from an interrogating read-out zone and return same to the zone in a form characteristic of the label. The deactivated state is derived in two ways: by removing the saturation lines from the ferromagnetic substance, using well-known de-magnetication technics; or by adding a great multiplicity of crosslinking lines of magnetic saturation and thus breaking the ferromagnetic substance up into a multiplicity of small relatively inactive uncoordinated areas.

19 Claims, 36 Drawing Figures

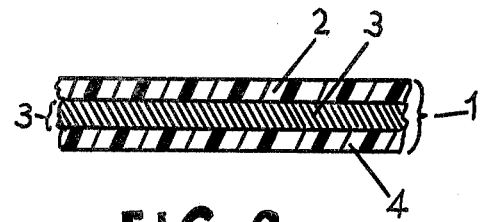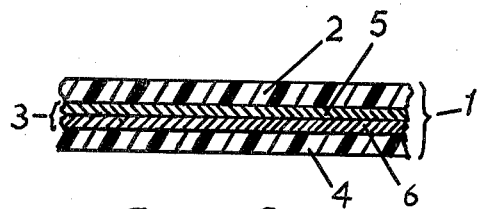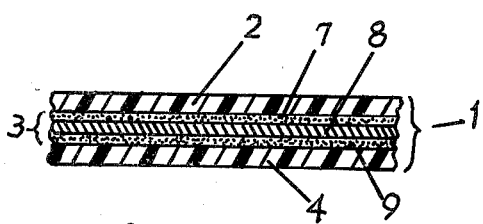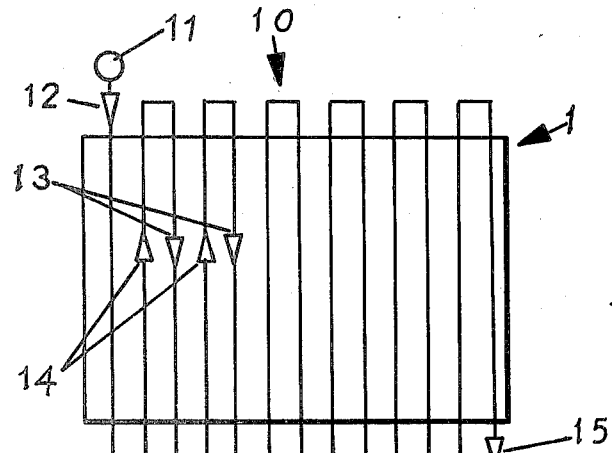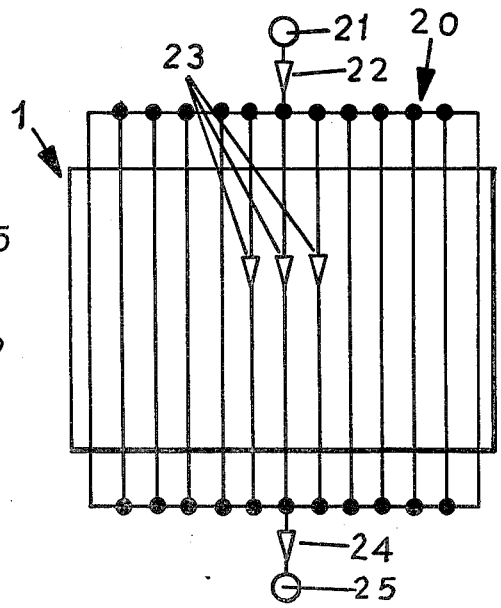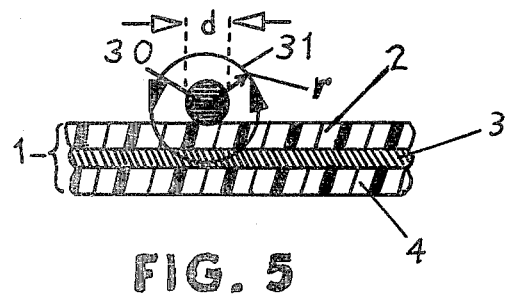

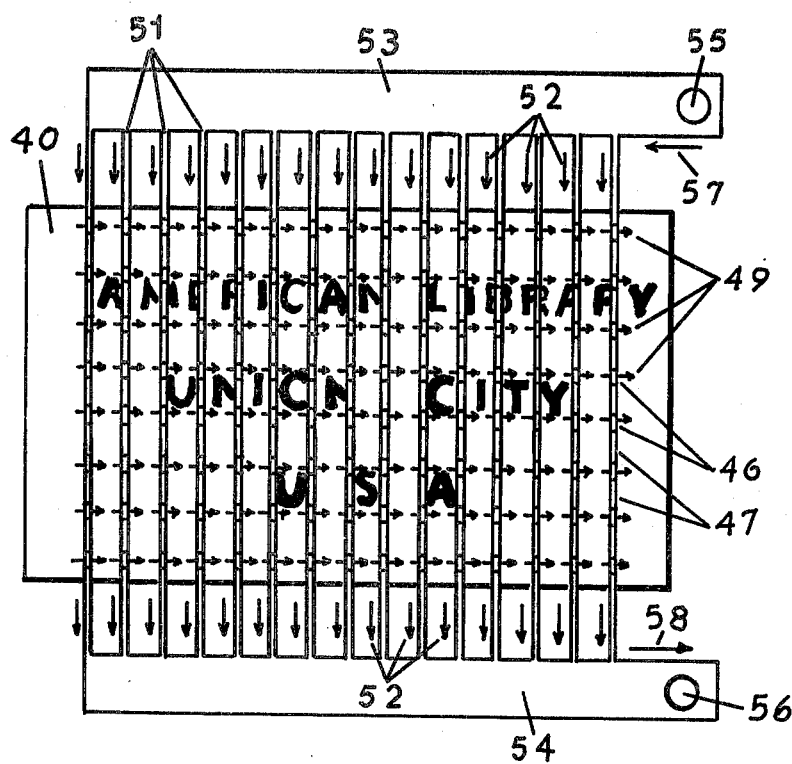
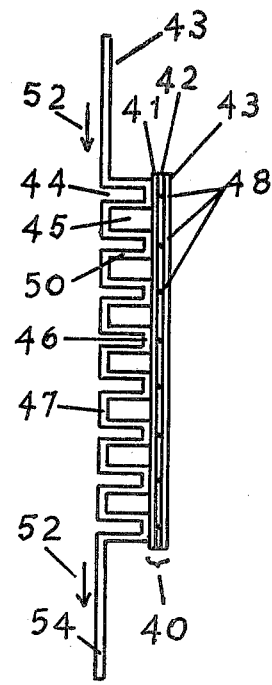
FIG. 6a    FIG. 6b
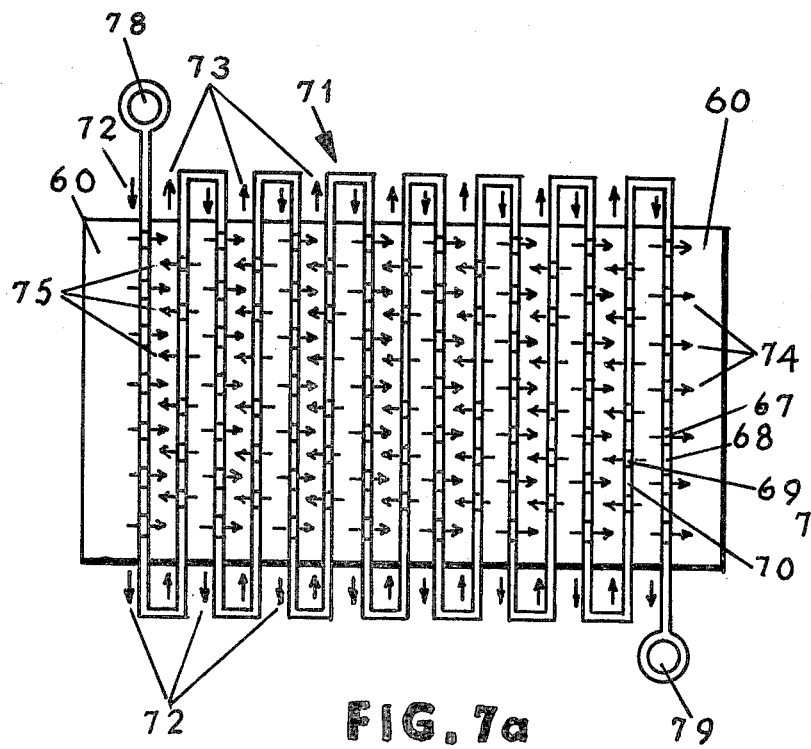
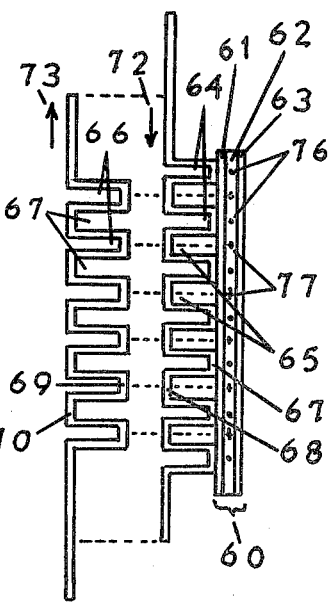
FIG. 7a    FIG. 7b

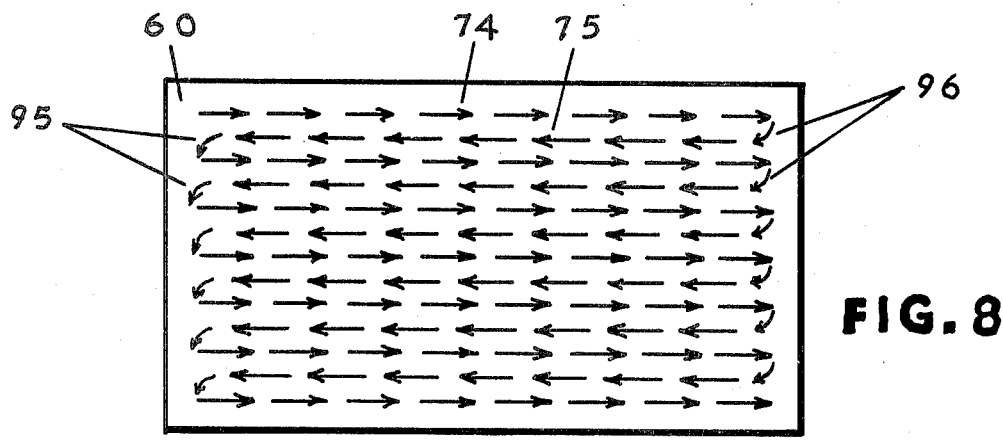
FIG. 8
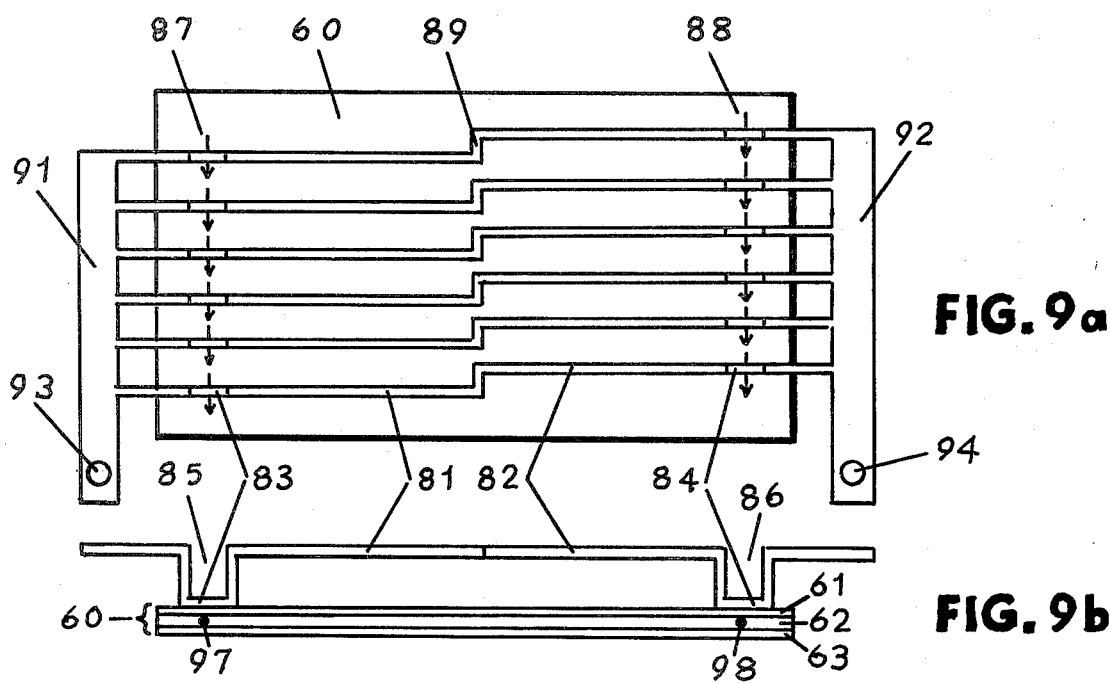
FIG. 9a
FIG. 9b
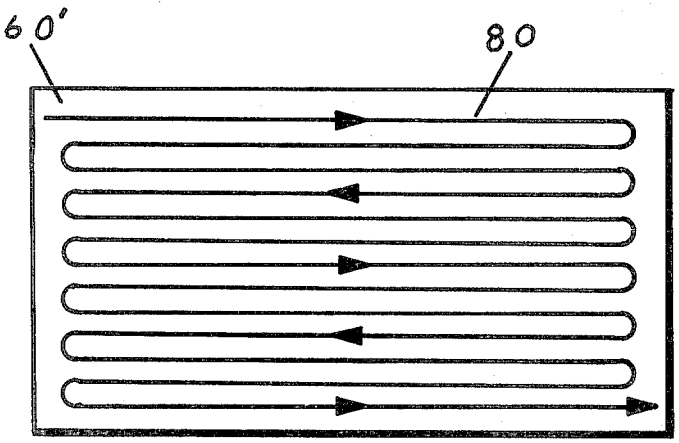
FIG. 10

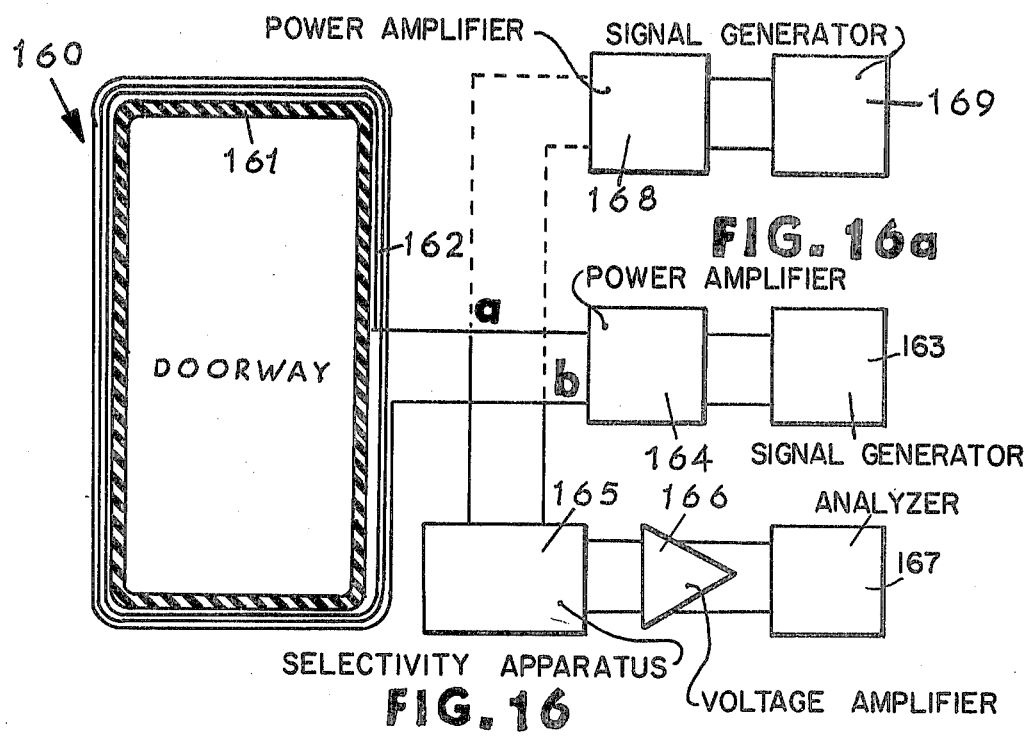
FIG. 16a
FIG. 16
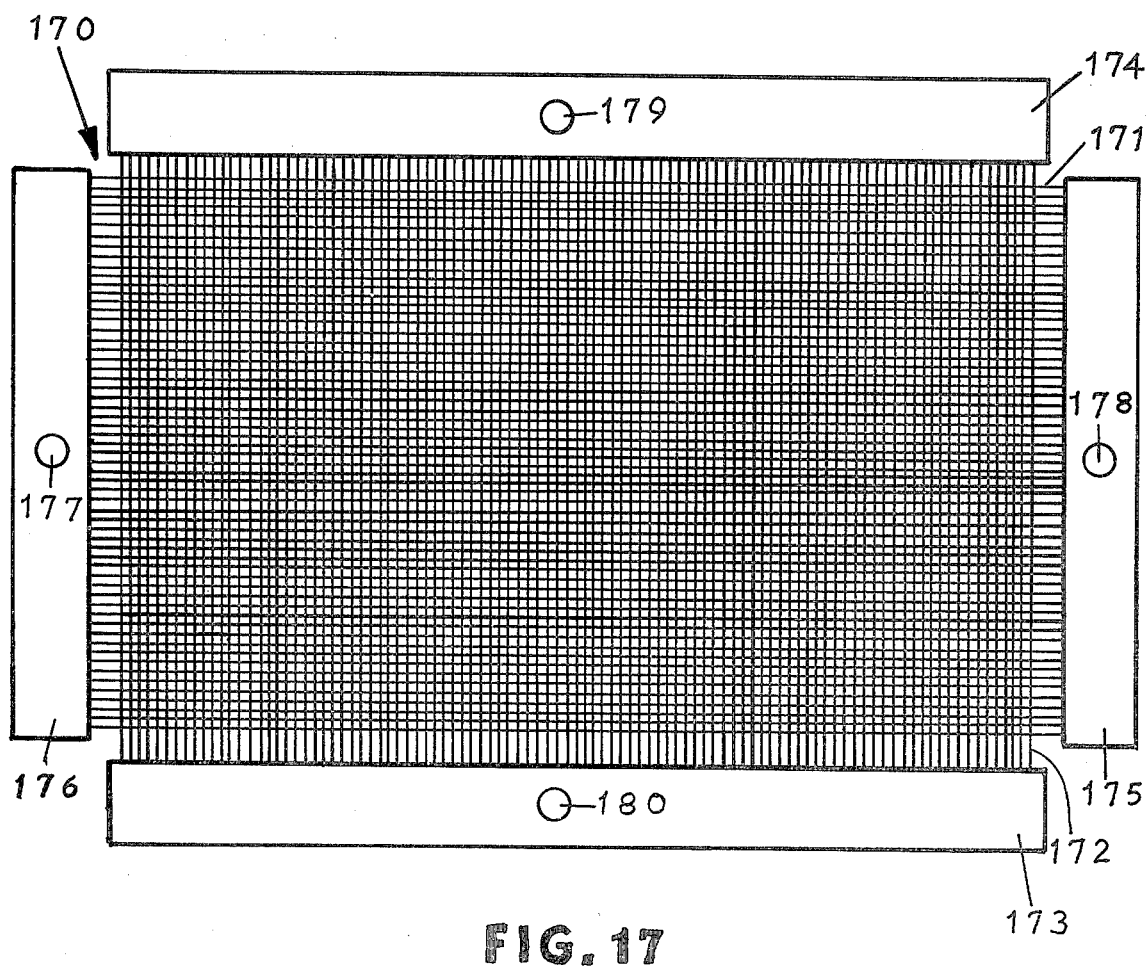
FIG. 17

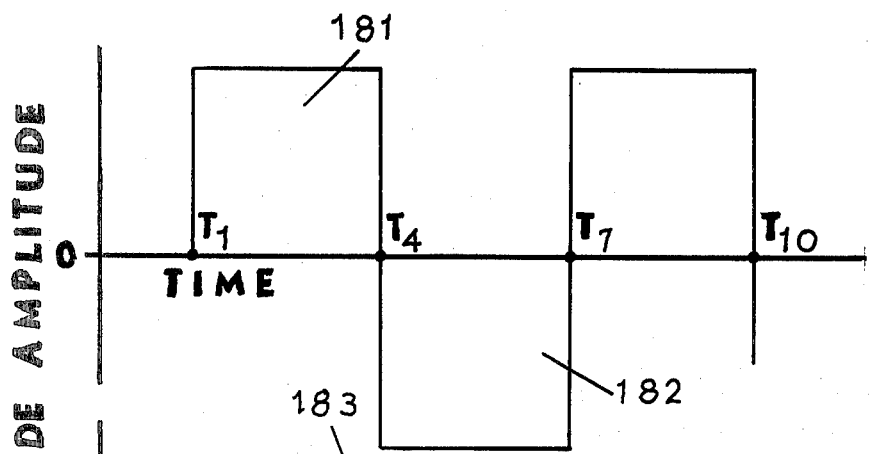
FIG. 18
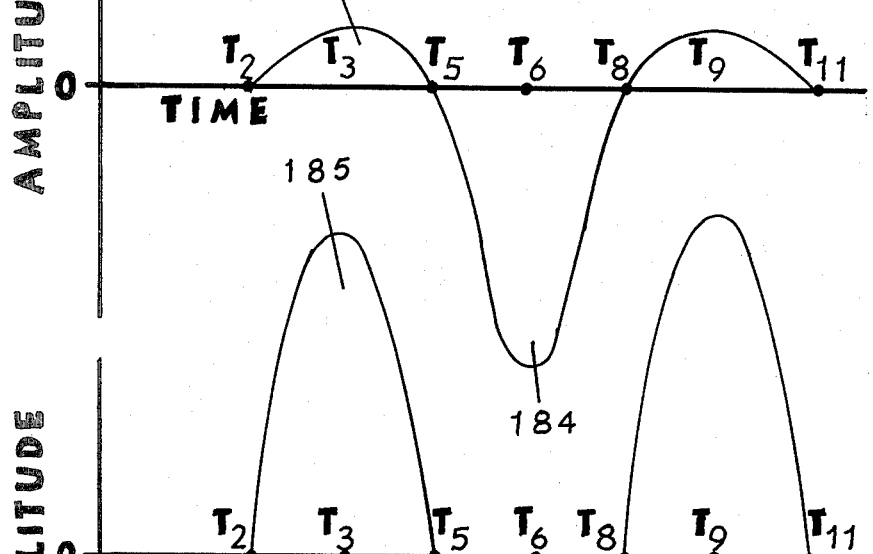
FIG. 19
FIG. 20
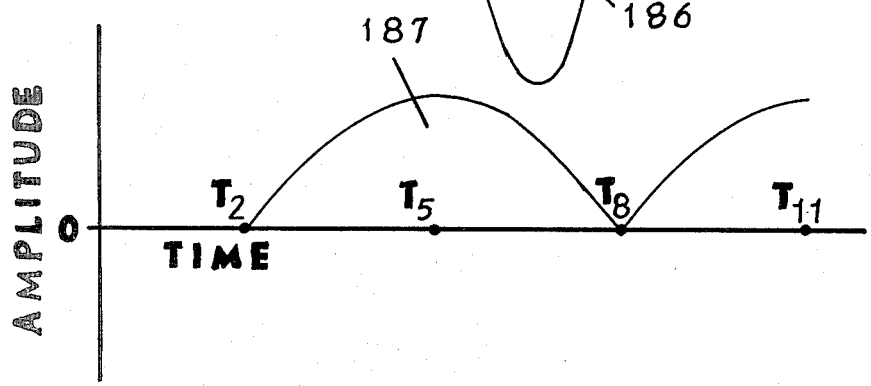
FIG. 21

ELECTRONIC STATUS DETERMINING SYSTEM FOR GOODS

CROSS REFERENCE TO RELATED APPLICATIONS

This invention related to the storage of information pertaining to people and their activities in modern computer code, to the control of this information, to its improved accessibility, and to the manipulation of this information as required by the multiple channels of commerce, industry, and society as a whole. It is a continuation in part of U.S. patent application Ser. No. 874,760, filed Nov. 7, 1969, now U.S. Pat. No. 4,055,746.

FIELD OF INVENTION

The invention relates generally to a ferromagnetic memory element in the form of a label, card, tag, coupon or marker in a system for detection of the memory element to prevent unauthorized removal of objects having the memory element attached thereto.

DESCRIPTION OF THE PRIOR ART

There are in existence several systems for detecting or preventing the theft of articles of value. One of these described in U.S. Pat. No. 3,754,226, granted to E. R. Fearon, Aug. 21, 1973, entitled "Open-Strip Ferromagnetic Marker And System For Using Same," describes an improved marker and system. This marker, when secured to an object, enables detection of the presence of the object when the object is in an interrogation zone, such as a doorway, when the zone has a magnetic field varying at a pre-determined fundamental frequency. This marker utilizes an elongated ferromagnetic marker of low coercivity capable of generating a detectable signal containing harmonics of the fundamental frequency when placed in the zone. An improvement to this invention described in U.S. Pat. No. 3,747,086, granted to Glen Peterson July 17, 1973, entitled "Deactivatable Ferromagnetic Marker For Detection Of Objects Having Marker Secured Thereto And Method And System Of Using Same," adds an element of high coercivity to the element of low coercivity whereby the magnetized, or unmagnetized, state of the high coercivity element controls the ability of the low coercivity element to generate and radiate harmonics of the interrogating signal. This improvement makes it possible to determine, with considerable precision, whether or not the goods passed, or carried, through the interrogation zone are being properly removed or whether the passage is illicit.

A somewhat earlier system for detecting or preventing the theft of articles corresponds with U.S. Pat. No. 3,292,080, granted to E. M. Trikilis, Dec. 13, 1966, makes use of a magnetometer in the interrogation zone and utilizes a magnetized object which identifies the article unless check-out procedure has removed the magnetism from the object.

French Pat. No. 763,681, issued to Pierre Arthur Picard, discloses a remote detection system which employs dynamic magnetic phenomena to detect the presence of an object. The system of Picard, which is fundamental to most of the useful ferromagnetic systems presently in use, is based upon the discovery that a piece of metal subjected to a sinusoidally varied magnetic field produces in a pair of balanced pickup coils in the vicinity of the applied field an induced voltage characteristic of the metal. The Picard patent discloses that high permeability metals produce an induced voltage including high order harmonics of the sinusoidal field.

Additionally, in the area of ferromagnetic markers, the patent issued to Robert E. Fearon Dec. 22, 1971, U.S. Pat. No. 3,631,442; the patent issued to James T. Elder and Donald A. Wright May 23, 1972, U.S. Pat. No. 3,665,449; and the patent issued to James T. Elder Oct. 9, 1973, U.S. Pat. No. 3,765,007, make use of some of the foregoing and related phenomena.

All of the foregoing systems have severe difficulties of one kind or another. The Trikilis system requires a rather large piece of ferromagnetic material for the marking of the merchandise, otherwise ambient variations in the magnetic field are greater than the changes caused by the Trikilis marker. The Picard system does not provide a means for deactivating the marker, nor does it provide a means of sufficient sensitivity to uniquely identify particular marker construction as opposed to other ferromagnetic materials. While the combined systems of E. R. Fearon and Glen Peterson, above referenced, together provide great sensitivity and a means of deactivating the marker, they require a very specific marker construction whereby one dimension of the marker, as the length, is very large compared with the other two dimensions of the marker, as the width and thickness. Similar requirements can be found in the methods used by J. T. Elder and Donald A. Wright.

SUMMARY OF THE INVENTION

In this application, as in the application of which this is a part, and in all applications which have been divided from the original application, above referenced, a computer is any instrumentality which automatically stores, assimilates and processes information of any kind whatsoever, makes a register of results for visual use by people, compares presently taken data with that previously taken, rings a bell, flashes a light, closes or opens a door, or operates another machine.

While the bits of digital information used in and stored by computers are usually made as physically small as possible so that a maximum of information can be stored in a minimum volume of space, and while the most modest of computers will require thousands of bits, the preferred embodiment of this invention requires only two bits of information and these bits must preferably occupy large volumes of space as compared with the more usual bit. Whereas, the usual computer bit is read in close proximity to the computer reading apparatus, the bit of this invention must usually be read in an open doorway considerably removed from the closest other piece of computer apparatus, and this accounts for the comparatively large physical size required of the bit.

Again, the usual computer is permitted to make contact, in one way or another, with the substance carrying the bit of information as it is read, or at least be so close to the subtance that contact could be made if it was desirable to do so. The present invention comprises a non-contact method of and system for distinguishing the presence, status and identity of an object by determining which of two bits of information are stored in a remote element or a label attached to the object. One bit, as interpreted by the computer and the manner in which it is programmed, advises that the object is being legitimately moved through a doorway, or other form of interrogation (reading) zone; the other bit, as interpreted by the computer, advises that the object is being illegitimately moved through said doorway or interrogation zone. When the first bit is read, the computer is programmed to do nothing or at least no more than advise an observer that the passage of the object is legitimate. When the second bit is read, the computer is programmed to sound an alarm, close and lock a door, or at least advise an officer that the passage of the object is illegitimate.

Most of the practical anti-pilferage systems in use today employ ferromagnetic marker strips which can be activated and deactivated. These strips are usually long and thin, a construction that adapts them to radiate high-order harmonics of an interrogating signal unless means, called deactivation, are taken to break-up the length or otherwise clamp the marker magnetically. While long skinny strips are useful in marking and identifying some goods items, for example—books, they are not so readily adaptable to other goods items, for example—clothing.

It is usually desirable to associate the ferromagnetic marker with the manufacturer's label. Customers are adapted to accepting manufacturer's labels and price tags but usually object to other extraneous materials. Particularly, are long strips of foreign matter objectionable in expensive articles of clothing; moreover, it is usually desirable to have the markers hidden or camoflauged so that the prospective shoplifter is not aware of their presence. For these reasons it is highly desirable to combine the ferromagnetic marker with the manufacturer's label, price tag, etc. At the same time, these labels and price tags usually have ordinary rectangular, circular or oval shapes such that lengths and widths are not radically different, and in these configurations they do not effeciently produce and radiate high-order harmonics of the interrogating signal or otherwise be disposed to an unique reading in an open doorway.

The object of this invention is to provide a ferromagnetic memory element, label, or marker tag, having an usual shape and size, and which in one mode of activation is an efficient receiver and radiator of responses to an interrogation signal, and which, in another mode of activation or deactivation, is an inefficient generator and radiator of responses to interrogating signals.

It is a well-known fact in sound and video recording that biases greatly enhance the ability of magnetic tapes to record signals with a minimum of noise and signal distortion. Both dc- (direct current) and ac- (alternating current) biasing have been used successfully. In the former, a bias of sufficient strength is applied to the tape to magnetically saturate it in one direction. An auxiliary winding in the recording head is then used to bring the tape back to an exact magnetic neutral, and in this condition the signal to be recorded is applied. The reason for doing this is that magnetic saturation, in one direction or the other, is a more sure point of departure than the random neutral the particles of the tape might happen to be in.

In the second form of biasing, a high frequency ac-bias of sufficient strength to magnetically saturate the particles of the tape in either direction is applied. The bias frequency is several times higher than the highest frequency to be recorded so that the applied signals in essence modulate the high-frequency bias after the manner of a carrier in radio-frequency techniques. This type of recording is almost noise and distortion free and is the one most used today.

While neither of these methods are adapted specifically into this invention, they are here referenced to establish the fact that ferromagnetic materials can, and have been, biased in a multiplicity of ways for certain purposes, thus avoiding the necessity of establishing experimentally or theoretically the conceptions that will be employed subsequently in this invention.

BRIEF DESCRIPTION OF THE DRAWINGS

FIG. 1a is a drawing in plan view of a typical memory element label that is attached to an object of commerce such as a suit of clothes.

FIG. 1b is an edge view, in elevation, of the memory element of FIG. 1a, disclosing the three essential parts.

FIG. 2a is an enlarged cross-section of a preferred form of recording medium used in the construction of the memory element of FIG. 1b.

FIG. 2b is an enlarged cross-section showing another construction for the ferromagnetic substance used in FIG. 1b.

FIG. 2c is an enlarged cross-section showing a third form of construction for the ferromagnetic substance used in FIG. 1b.

FIG. 3 is a schematic drawing showing the electrical conductor pattern in relation to a typical memory element and label whereby the ferromagnetic memory substance of the label is prebiased or activated.

FIG. 4 is a schematic drawing showing an alternative conductor pattern in relation to a typical memory label whereby the ferromagnetic substance of the label is activated.

FIG. 5 is a drawing in cross-sectional view showing the magnetic field pattern about one of the biasing conductors of either FIG. 3 or 4 whereby the biasing, or activating, magnetic saturation pattern is established in the ferromagnetic memory substance.

FIG. 6a is a plan view showing the placement, and construction of, a set of conductors to bias or activate the ferromagnetic substance of a memory element or label, in one mode of operation.

FIG. 6b is an end view, in elevation, further disclosing the placement and construction of the set of biasing conductors of FIG. 6a.

FIG. 7a is a plan view showing the placement and construction of a set of conductors used to bias and activate the ferromagnetic substance of a memory element, or label, in another mode of operation.

FIG. 7b is an end view, in elevation, further disclosing the placement and construction of the set of biasing conductors of FIG. 7a.

FIG. 8 is a drawing in plan view showing the magnetic bias, or activation, pattern that has been established in a typical memory element by the conductor biasing pattern of FIGS. 7a and 7b.

FIG. 9a is a drawing in plan view showing the placement and construction of an additional set of biasing conductors used to slightly modify or add to the magnetic biasing pattern of FIG. 8 whereby a pattern of great length and strength is established.

FIG. 9b is an edge view, in elevation, further disclosing the placement and construction of the biasing conductors of FIG. 9a.

FIG. 10 is a drawing in plan view showing the magnetic bias pattern that results from the combined actions of the conductor patterns of FIGS. 7 and 9.

FIG. 14b is a view in elevation of the hand-operated, stamp-like head of FIG. 14a.

FIG. 16 is a schematic drawing of the read-out apparatus of this invention, or the interrogation zone as it is sometimes called.

FIG. 16a is a block diagram showing additional electronic units which can be added to provide an alternative method of label interrogation.

FIG. 17 is a schematic drawing in plan view of an alternative form of deactivation equipment that is used in practicing the present invention.

FIGS. 18, 19, 20, and 21 are graphs of some of the pulse forms which are applied and which result in practicing the invention.

DETAILED DESCRIPTION OF PREFERRED EMBODIMENTS

Ferromagnetism is a rather complicated subject and much research has been undertaken, and much written, to provide the understanding which we presently have. For such an understanding we are obliged to refer to the books that have been written and even to original reports that are found in numerous technical journals. For the purposes of understanding this invention perhaps a review of a few basic conceptions will suffice.

Figure 15:
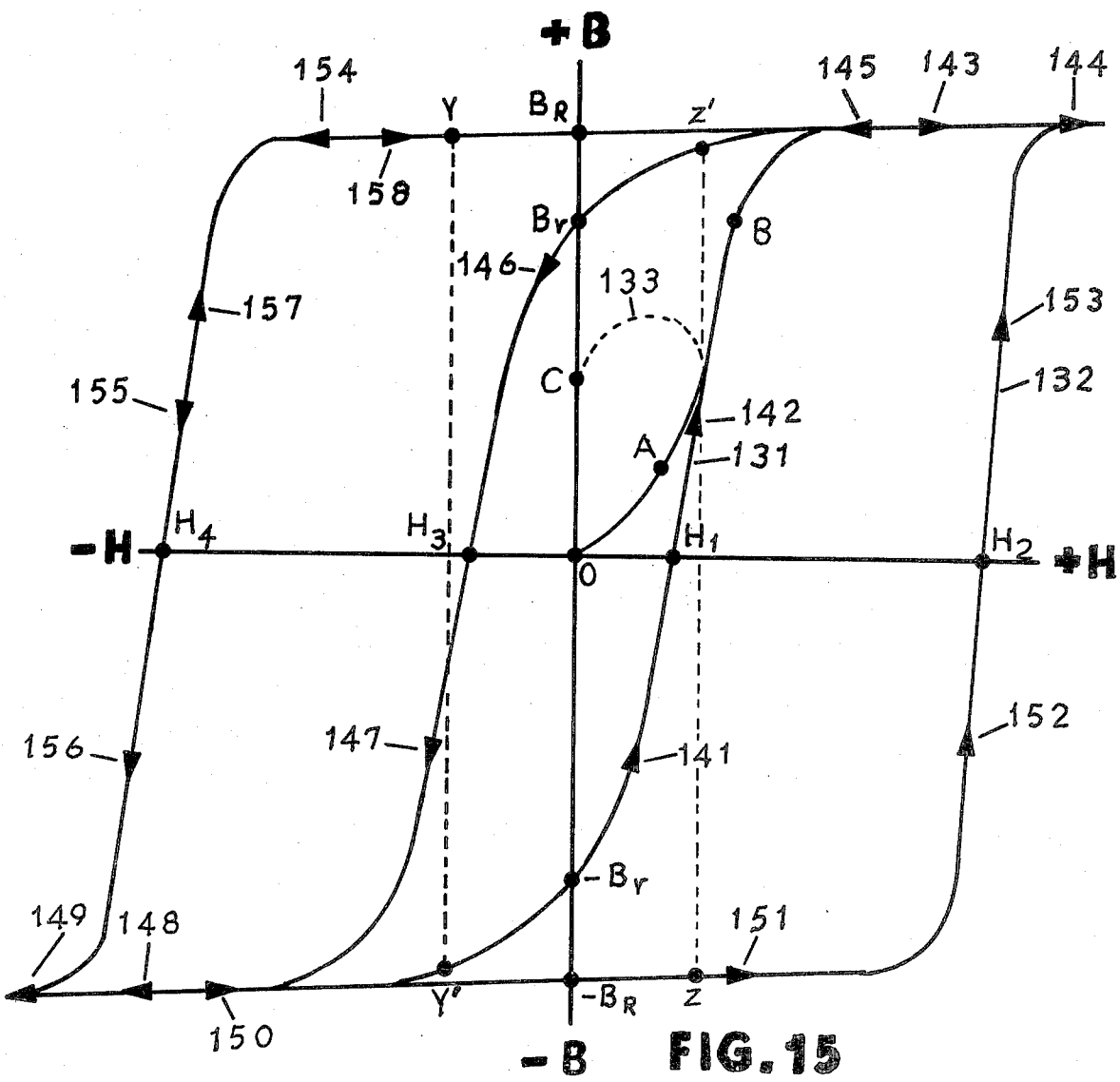
FIG. 15 is a graph of the hysteresis loops of the materials used to form the ferromagnetic memory substance by means of which the invention is further described and explained.

Iron and its oxides, from which we get the prefix "ferro," is one of the basic elements exhibiting ferromagnetism. Nickel and Cobalt, which are closely related to Iron in their atomic structures, also exhibit ferromagnetic properties, and of particular interest are the alloys we have learned to make of Iron, Nickel, Cobalt, Carbon, Aluminum, Platinum, Manganese, etc. Generally speaking, ferromagnetism is the phenomenon whereby certain electrically uncharged materials attract each other. At one extreme, we have the hard permanent magnets with which all of us are familiar and with which most of us have toyed at one time or another. At the other extreme, we have the soft 'exotic alloys' which we use in transformers, electric motors, microphones, recorders, and similar machines, and with which the average person is quite unfamiliar; nevertheless, their basic performance is essentially the same as that of the hard permanent magnet or P.M. The performance of both extremes, as well as the thousands of examples therebetween, is described by what we call a hysteresis loop. FIG. 15 shows the essential form of the two extremes of ferromagnetism; the fat loop 132 describes the hard P.M. while the relatively skinny loop 131 describes the soft exotic material—providing we understand that the scale along the abscissa, or H-axis, has been greatly contracted. If the hysteresis loops of the extremes of ferromagnetism were plotted in true scales, the drawing would have to be many sheets of paper wide—that, or the hysteresis structure of the most exotic alloy would be entirely hidden within the finest straight line we can draw.

Ferromagnetic elements, compounds and alloys have atomic and molecular structures which on a microscopic scale are responsible for the magnetic properties we perceive and use. To get at these properties and, if possible, improve them, we are limited, first of all, by the choice of elements available to us; secondly, we are limited by the chemical compoundings we can make of the available elements; and thirdly, by the mixtures (the alloys) we can make of the elements and/or their chemical compounds. With these selections made there is nothing in the world we can do that will alter the microscopic properties of what we have compounded or alloyed. Fortunately for us, however, there is a larger structure within ferromagnetic materials available to us upon which we can work, a macroscopic structure which we call the domain structure.

While very large compared with the structures of an atom or molecule, the magnetic domains of ferromagnetic materials are for the most part invisible to the unaided eye. On polished surfaces they do sometimes become visible with the help of a simple optical microscope, and domain structures can be made visible and studied with the help of x-rays, polarized light, polarized neutrons, electron beams, etc. Iron whiskers, however, and with which most who have played with P.M's. are familiar, contain very few imperfections and become aligned in an external magnetic field much as unseen domains do.

Once a ferromagnetic material has been derived or compounded, we are obliged thereafter to work with the domain structure in perfecting our machines. It is this structure which we arrange or alter when we heat and cool or 'temper' magnetic alloys; it is this structure which we alter when we mechanically rub, bend or otherwise cold-word a ferromagnetic material. For example, the exotic properties of some of the best soft alloys can be lost or degraded by merely bending a strip of the material a few times over a sharp fulcrum. As a matter of fact, in the earliest days of there alloys before they were stabilized, merely dropping them to the floor would degrade them. Heating such alloys above a certain point also usually destroys, or greatly alters, a desirable domain structure or orientation. Again, heating and cooling in magnetic fields is frequently used to obtain desirable and more-or-less permanent domain alignments in ferromagnetic materials. Such alignments can, however, be temporarily obtained by the application of a magnetic field without the aid of heat. As a matter of fact, it is these alignments of the magnetic domains of a given piece of ferromagnetic material that produce its characteristic hysteresis loop.

Referring again to FIG. 15, we start at the origin, or point, O, in tracing the original hysteresis loop, apply a MMF, or magnetic driving force along the +H axis, and move to the point A. With this much applied field, a domain with magnetization direction parallel to the field direction has the lowest energy and the domain walls tend to move to enlarge the volumes of favorably oriented domains. The magnetization and favorable movement of domain walls increases as indicated by the curve OAB. Over that part of the curve indicated by OA, or a little beyond, the domain wall motion is reversible; i.e., on the removal of the field the domain walls return to their initial positions. Upon application of higher fields as we move past arrow 142 toward B, at the approach of the knee, the domain walls get displaced beyond the prevailing internal energy barriers so that when the MMF is removed, the domain walls having stretched beyond their elastic limits nolonger return to their initial positions; rather they trace out a curve, 133, which we call a minor hysteresis loop, and fall back to the point, C, on the +B axis and in this condition they will remain until some magnetic force is applied that is great enough to produce wall motion and domain alignment, or mis-alignment, as the case may be.

If we continue to apply the MMF, i.e., the magnetic force along the +H-axis, instead of removing it a little beyond the arrow 142, we'll follow the curve through point B, as indicated by the arrows 143 and 144, beyond which no further magnetization of the material takes place—no matter what MMF is applied. This means that the material is magnetically saturated; i.e., all of the domains within the reach of the applied MMF have become oriented in a direction parallel with the applied field so that further alignment, or magnetization of the material, is impossible.

If we now remove the applied MMF, most of the domain structure derived through saturation will be retained and the material will relax slightly to the point, $B_r$, and in this domain structure, which is far beyond the reach of ordinary ambient temperature forces, it will remain indefinitely; i.e., until acted upon by some additional MMF, or other physical force sufficient to move or alter the structure.

In addition to the foregoing, there is some spontaneous domain orientation in ferromagnetic substances even in the absence of an applied field. In the unmagnetized state, particularly in large bodies, the magnetic domains are oriented pretty much at random so that the net magnetization of the whole body is zero. When, however, the body is rolled into thin sheets which is a typical form of fabrication for commercial applications, it becomes easier for the domains to be aligned with the directions of rolling so that we begin to get some domain orientation. When the thin sheets are cut into narrow strips we get further spontaneous domain alignment, and in long needle-like pieces the alignment is such that the needle behaves like a single domain and it requires a considerable MMF to overcome or reverse the alignment. There is also a tendency, particularly in thin sheets and strips for strong domains to spontaneously affect their neighbors, causing them to become aligned in agreement. Thus, if spots of magnetic saturation are produced in thin sheets of ferromagnetic material by externally applied fields, there will be a tendency for these to spread or grow within the material, perhaps joining other spots, making a still stronger magnetization.

It is within the province of domain wall movements and structures that this invention is concerned.

FIG. 1, views a and b, shows a typical ferromagnetic memory element and manufacturer's label, 1, in combination. 2 is the printed face of the label which is composed of paper, cloth, plastic, or other suitable non-magnetic material and which is preferably very thin. 4 is the unprinted back of the label which, like 2, is composed of paper, cloth, or other suitable non-magnetic material, but which, unlike 2, may be provided with an adhesive surface for the ready attachment to objects being marked and protected. 3 is a thin layer of ferromagnetic substance that is sandwiched between 2 and 4. The label, 1, may be of any desired size and shape depending upon the application requirements of the trade; i.e., no particular specifications are placed upon its shape or size as is customary with other ferromagnetic markers.

FIG. 2a shows, in cross-section a construction for the memory element label, 1, wherein the ferromagnetic substance, 3, is comprised of one thin layer of uniform magnetic material. 2 and 4, as before, are the covering layers of non-magnetic material.

FIG. 2b shows, in cross-section, a memory element label, 1, wherein the ferromagnetic substance is comprised of two thin layers, 5 and 6, of ferromagnetic materials which have different magnetic properties. For example, 5 may be of ferromagnetic material that has relatively high permeability and low coercivity, as 131, FIG. 15, while 6 may be a ferromagnetic substance that has relatively low permeability and high coercivity, as 132, FIG. 15. This combination of materials has certain useful properties that will be brought out subsequently.

FIG. 2c shows a memory element label, 1, wherein the ferromagnetic substance is comprised of three layers 7, 8, and 9, but usually of of only two ferromagnetic materials. For example, layers 7 and 9 will will usually be the same material and 8 will be a different material having distinguishing ferromagnetic properties compared with 7 and 9. In another application, 7 and 9 become materials having a high dielectric constant which enhance the action of ferromagnetic layer 8. Details concerning these applications will be given subsequently.

FIG. 3 shows schematically the series arrangement of biasing conductors generally indicated by the arrow 10. 1 is the memory element label directly beneath the biasing conductors; 11 is one terminal of the biasing network, and 16 is the other terminal by means of which an appropriate EMF is applied to the network and currents flow therein as indicated by the arrows 12, 13, 14 and 15. As can be seen, currents flow in opposite directions in alternate legs of the biasing network and magnetic fields established at right angles thereto, as shown in FIG. 5.

FIG. 4 shows schematically a parallel arrangement of conductors, 20, whereby currents flow in the same direction in all parts of the biasing network, as indicated by the arrows 22, 23 and 24. Again, 1 is the memory element label, 21 and 25 are the terminals by means of which an EMF is applied to the network to produce a desired current flow.

Referring now to FIG. 5 which shows a typical cross-section of the memory element, 1, in the vicinity of one of the conductors 30 of either network 10 or 20. As before, 2 and 4 are the non-magnetic covering faces of the memory element 1, and 3 is the ferromagnetic substance sandwiched therebetween. For simplicity of exposition, the conductor 30 is shown to have a circular cross-section of diameter, d, but in actual practice it will probably be a rectangular conductor of a printed circuit. According to the law of Biot and Savart, the tangential component of the magnetic field at the center of the ferromagnetic substance, produced by a flow of current in the conductor 30, will be $$B = \frac{2\mu I}{\frac{d}{2} + a + \frac{b}{2}} = \frac{4\mu I}{d + 2a + b}, \text{ e.m.u.} \quad (1)$$

where
- $\mu$ is the permeability of the ferromagnetic substance 3,
- I is the magnitude of the current flowing in conductor 30, in abamps,
- d is the diameter of 30, in centimeters,
- a is the thickness of non-magnetic cover, 2, in centimeters
- b is the thickness of the ferromagnetic substance, likewise in centimeters.

Accordingly, if $\mu$ is only 1000, a rather nominal value; d=0.02 Cm.; a=0.01 Cm.; and b=0.02 Cm.

$$B = \frac{4,000 I}{.02 + .02 + .02} = 67,000 \, I \text{ gauss.} \quad (2)$$

And if the saturation flux density of the ferromagnetic substance is 6,700 gauss, a value appropriate to some of the exotic alloys, a current of only 0.1 abamp = 1.0 Prac. Amp. would be momentarily required to saturate such a ferromagnetic substance tangentially down to its center. Slightly more than this would be required to saturate it all the way through. Currents of not more than three times this value would be sufficient to saturate the highest flux-density materials presently available. What is more, most of the materials that would be used would have permeabilities greater than 1,000 so that currents smaller than the above would be adequate in many cases.

When the biasing current is removed, the flux density in the ferromagnetic material will fall back to its remanent value $B_r$ or $B_R$, as shown by FIG. 15, depending upon the kind of material employed, and here it will remain until acted upon by another magnetic force. It should be noted that the remanence value for a given magnetic material is one of the most sure and repeatable values the material has. If the conductors of the network of FIG. 4 are sufficiently close together, the entire body of the ferromagnetic substance, 3, will be magnetized to the values $B_r$ or $B_R$, and in a direction perpendicular to the biasing conductor, or parallel to the length dimension of 1, as it is shown in FIG. 4. In this magnetically oriented condition where all of the magnetic domains are appropriately organized, the memory element label, 1, for the purpose of this invention, is said to be activated.

At this point in the exposition of this invention, it is appropriate to refer to the prior art, for a moment, where long needle-like ferromagnetic markers are preferred—indeed, required. The reason for this, as already given, is that in long thin needle-like structures, the magnetic domains tend toward a self-alignment along the longest dimension and thereby pick up a magnetization. In this sense, the long edges of the ferromagnetic material provide domain aligning discontinuities. To keep a magnetic domain oriented perpendicularly to a long edge, or discontinuity, requires more energy than is required for orientation parallel with the adge. Accordingly, the magnetic domains adjacent the edges align themselves with the edges to meet the minimum energy requirements of the material and those domains next to the edge domains, as we move into the material, tend to align themselves with the edge domains so that in long, skinny strips of material there is a general magnetic organization of the material along the longest dimension. It is because of this magnetic domain alignment, or organization, that long thin strips make useful ferromagnetic markers. When placed in an interrogating magnetic field, the strips readily absorb energy from that component of the field that is parallel to the long dimension of the strip.

In larger sheets and bulk bodies of ferromagnetic materials, the only places where there is any spontaneous domain alignment whatsoever are those adjacent an edge. Throughout the remainder of the material the domains fall at random and so aren't organized to produce any particular result. For these reasons, large sheets and bulk bodies of ferromagnetic materials do not efficiently absorb and re-radiate the energy of an interrogation zone; rather, the energy that is absorbed only adds to the random motions of the magnetic domains and is lost in heat.

In the present invention, we are not limited by the edge alignments of long thin strips; rather, we take the material provided in a memory element label, of whatever shape and size, and pre-organize it magnetically by some suitable arrangement of electrical conductors, or magnets, adjacent thereto and through which we drive a short pulse of current, or magnetic flux, respectively. The entire piece of material then becomes organized at a point of remanence and is therefore activated to receive and radiate energy in an interrogation zone. Because it saves material, avoids excessively thick and heavy and unattractive labels, and because it is desirable magnetically, we keep the thin dimension of the ferromagnetic material but give complete freedom of artistic design to the other two dimensions.

Rather than drive an entire sheet into magnetic saturation by a current sheet, and in so doing, provide a memory label that is less good than what is possible, it is preferable to use discrete conductors at a suitable separation, as shown by FIGS. 6a and 6b. These conductors should be sufficiently close together, perhaps closer than shown, that more-or-less continuous paths of magnetic saturation are produced, and good use is made of the material that is available. Since magnetic fields are produced at right-angles to conductors carrying currents, some means must be provided to limit the magnetic field to discrete paths. The means employed by FIGS. 6a and 6b is that of a system of bent conductors having portions, such as 46, in contact with memory element 40, and portions, such as 47, remote therefrom, with portions, such as 50, to interconnect the portions 46 and 47. Such an arrangement can quite easily be provided using printed circuit techniques with portions 46 on one side of a relatively thick board, and portions 47 on the other side, and with overlaying holes through the board at the terminal ends of each portion, and interconnected with conductors, such as eyelets or rivets through the holes to provide the portions 50. If the circuit board is of the order of 1/16 inch thick, the field in the ferromagnetic substance, 42, due to conductor portions 47, will be at least four times less than the field produced by conductor portions 46. This should be sufficient to satisfy the requirement of producing discrete paths of magnetic domain alignment. And of course the circuit board can be made thicker than 1/16 inch. Again, it would be no great hardship to make tools that would punch and bend the conductor sets of FIGS. 6a and 6b from sheet material. In any event, when the multiplicity of magnetically aligned parallel domain paths of a memory element label are attached to an article of goods in an activated state and presented in an interrogation zone, a multiplicity of responses will be produced in phase agreement and the result will be much as if we had a multiplicity of separate ribbons any single one of which is able to produce a readily identifiable response, as proven by the apparatus in daily use under some of the above referenced patents. Obviously, the magnitude of the total response of a memory element label, such as that if FIGS. 6a and 6b, will be multiplied by the number of paths provided as long as the responses are all in phase agreement.

Continuing with FIGS. 6a and 6b, 51 indicates the current conductors above described, 52 indicates arrows showing the direction of currents in the conductors, 53 and 54 are buses which connect the conductors 51 in parallel, while 55 and 56 are terminals to which a suitable EMF is applied. 49 indicates a set of arrows pointing in the direction of magnetic saturation and domain alignment in ferromagnetic substance 42; 48 points to the tips of arrows 49 in 42. 41 and 43 are the non-magnetic layers covering 42.

We go now to FIGS. 7a and 7b where the series arrangement of conductors is worked out in detail. This essentially is a dual presentation of the conductors of FIGS. 6a and 6b, with the conductor portions, 67, adjacent the memory element label, 60, of a first set of conductors, lined up opposite to the remote conductor portions, 70, of the alternating second line set of conductors, and vice-versa. 69 indicates the conductor portions of the second line set of conductors adjacent the memory element label, 60, and 68 indicates the remote conductor portions of the first line set. 74 points to the magnetic saturation, domain alignment arrows produced by the first line set of conductors, while 75 points to the arrows of magnetic saturation and domain alignment produced by the second set of line conductors. To better show the alternating adjacent and remote portions of the two sets of conductors, the second set of line conductors is shown exploded away from the memory element label, 60, in FIG. 7b, as indicated by the dotted lines. 76 points to the arrow tips of magnetic saturation and domain alignment in 62, and 77 points to the arrow heads of alternating lines of saturation and domain alignment. 71 is an arrow pointing generally to the series set of conductors; 72 points to the arrows of current flow in the first set of conductors, and 73 points to the arrows of current flow in the second set of conductors. 78 and 79 are the terminals to which a suitable EMF is applied.

FIG. 8 shows the complete magnetic saturation domain alignment pattern produced by the conductors of FIGS. 7a and 7b. When a memory element label attached to goods, and activated as shown by arrows 74 and 75, is presented in an interrogation zone, one line set of magnetic saturation and domain alignment will respond primarily to one phase of an interrogating signal while the second line set of magnetic saturation and domain alignment will respond primarily to an opposite phase of the interrogating signal, as will be made clear subsequently.

In both the parallel line sets, and the series line sets, of magnetic saturation, FIGS. 6a and 7a, respectively, it is clear that the magnetic saturation will make line troughs through the ferromagnetic material, and adjacent these troughs, on either edge, will be parallel streaks of domain alignment.

Taking a second look at FIG. 8, the possibility of joining the alternating lines of magnetic saturation and domain alignment, to form a single folded pole alignment of great length, comes to mind. If we can add the pieces of magnetic saturation and domain alignment indicated by the arrows 95 and 96, the alternating lines 74 and 75 can be joined. This can be accomplished by means of the conductor pattern of FIGS. 9a and 9b where conductor elements 83 adjacent memory label 60, on the left side, and adjacent conductor elements 84, on the right side, are joined by staggering the conductors one line position, as at 89. With currents passed through these conductors, the appropriate pieces of saturation and alignment in the margins at both ends will be produced and, with a little help from spontaneous polarization, the lines will be joined to provide the overall saturation and domain alignment pattern of FIG. 10. If necessary, more complicated conductor arrangements can be provided at the ends, but it is believed that designation of which lines are to be joined, and which are to be kept separated, will be sufficient. Effectively, this makes one very long pole which becomes an exceptionally good absorber and radiator of energy in an interrogation zone, especially in view of the fact that energy can be absorbed from both phases of one wave period and delivered in one phase of another time period. Particularly will this be the case when the total length becomes an appreciable fraction of a wave-length.

Considering the conductor configurations of FIGS. 7a, 7b, 9a and 9b from a practical point-of-view, it is clear that these can be accomplished by means of printed circuits on two sides of a printed circuit board of appropriate thickness, or by means of die punched sets of conductors, as previously described. We turn now to the means taken to deactivate the memory element labels.

As is now broadly recognized, two magnetic states are required in any practical anti-pilfering system, just as two magnetic states are required for the storage of information in any practical computer system that uses magnetic storage elements. In this respect, the fundamental memory requirements of anti-pilfering systems are no different than the fundamental memory requirements of computer systems. The only difference is one of arithmetic. Whereas, a computer requires hundreds, or thousands, of memory elements for each function performed, an anti-pilfering system requires only one memory element for each function performed.

Figure 11:
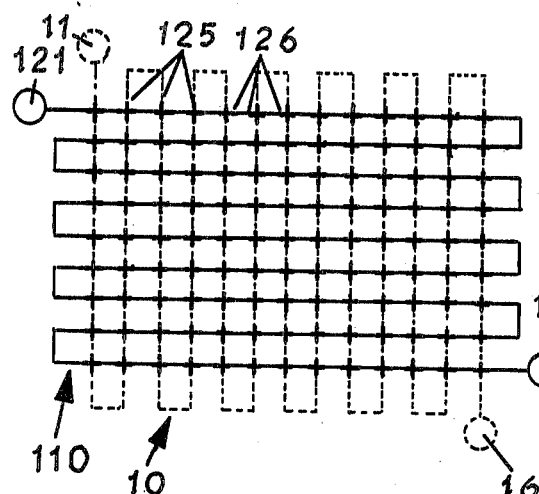
FIG. 11 is a schematic drawing in plan view showing how the activation bias pattern of FIGS. 5, 7, 8 and 10 is blocked by a cross-biasing network and hence deactivated.
Figure 12:
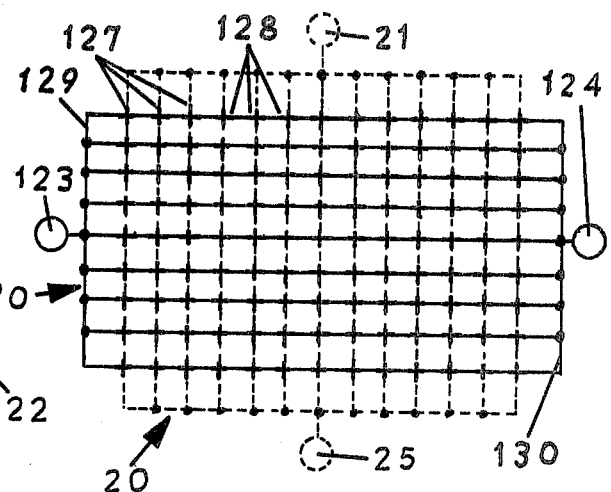
FIG. 12 is a schematic drawing in plan view showing how the activation bias patterns of FIGS. 4 and 6 is blocked by a cross-biasing network and hence deactivated.

To activate a memory element label, parallel lines of magnetic saturation and domain alignment were provided along the long dimension of the label by means of parallel current lines along the short dimension of the label. To deactivate the memory element label, we now provide crossing lines of magnetic saturation along the short dimension of the label by means of current lines along the long dimension of the label, as shown by FIGS. 11 and 12. FIG. 11 shows the arrangement of conductors used to nullify the series activation configuration, and FIG. 12 shows the arrangement of conductors used to nullify the parallel activation configuration. While for convenience of exposition, we have shown parallel lines of deactivation, it is recognized that deactivation might be better accomplished if the lines were randomly spaced and oriented. Be this as it may, we'll proceed with the exposition as it pertains to the regularly spaced and oriented arrangements.

In FIG. 11, 10 points to the schematic arrangement of conductors, previously shown in FIGS. 3 and 7a, and here shown by dotted lines. 110 points to the schematic arrangement of conductors, in full line, used to deactivate the memory element label. Heavy line segments 125 indicate those portions of the activating conductor configuration 10 that are adjacent the label, while heavy line segments 126 indicate those portions of the deactivating conductor configuration 110 that are adjacent the label. Thus, each component of activation, saturation and domain alignment is broken up by a crossing component of deactivation, saturation and domain alignment. Overall, this means that the memory element label, instead of being domain organized in a multiplicity of long parallel lines, is broken up into a multiplicity of small domain areas which are ineffective in receiving and radiating energy in an interrogation zone.

FIG. 12 shows a similar arrangement of deactivating conductors 120 used to deactivate the pattern produced by the configuration 20, previously shown in FIGS. 4 and 6a. Heavy line elements 127 indicate the conductor elements of the network 20 adjacent the memory element label, while heavy line elements 128 indicate the conductor elements of network 120 that are adjacent the memory element label. As in FIG. 11, these line elements are at right angles to each other as likewise will be the elements of magnetic saturation and domain alignment. In both FIGS. 11 and 12, the crosses can be used to indicate the crossing current elements, or the elements of magnetic saturation and domain alignment.

Figure 13:
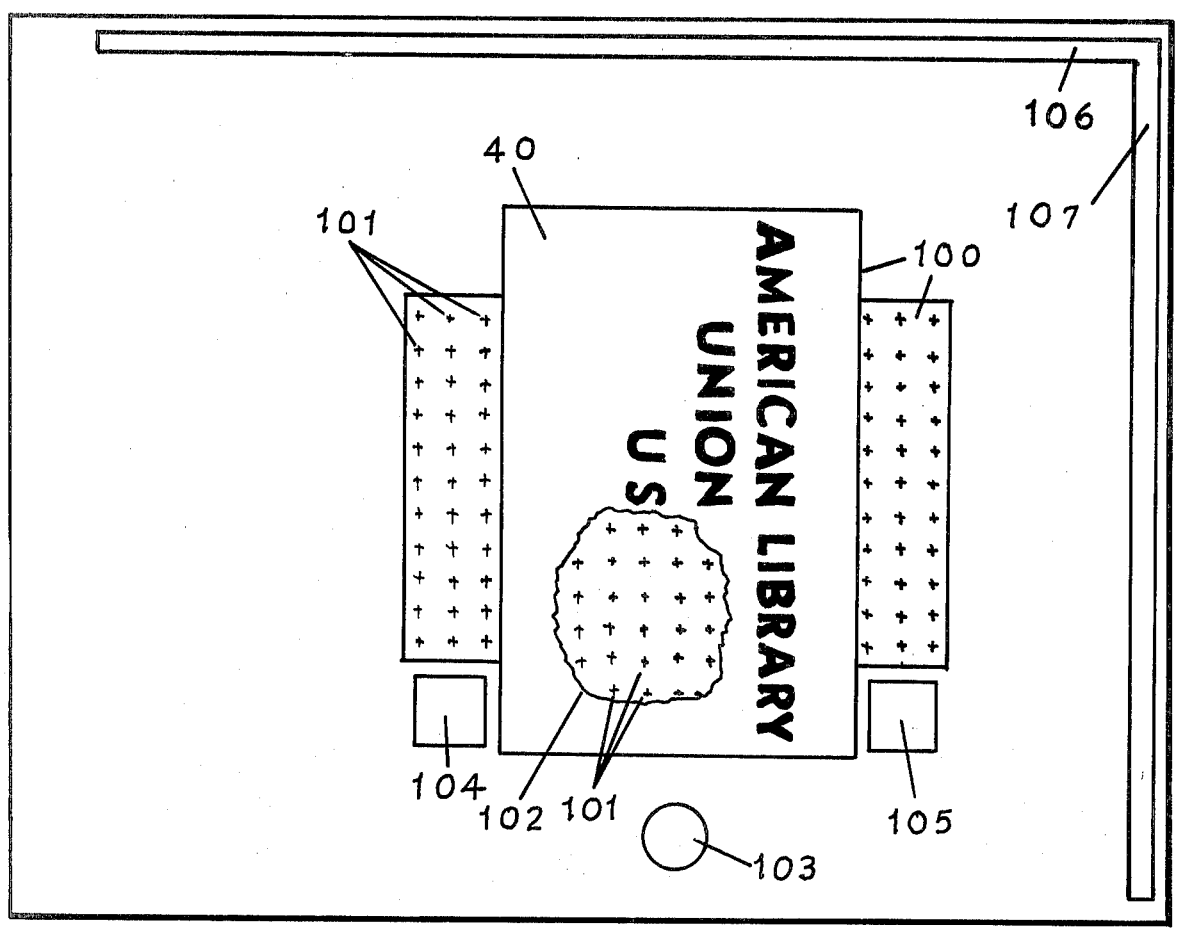
FIG. 13 is a drawing in plan view of the activation-deactivation biasing head which provides the conductor biasing patterns of FIGS. 6, 7, 9, 11 and 12.

FIG. 13 shows a typical activate/deactivate head by means of which memory element labels can readily be positioned and activated or deactivated as requirements dictate. Somewhat centered in the head is the sensitive area 11 having the conductor patterns of FIGS. 11 and 12 (not shown), as well as those of FIGS. 3 and 4 (also not shown), but having the location of the activate/deactivate points shown by the crosses 101. This head is adapted to either pre-activate labels prior to attachment to goods or thereafter as may be required. When activation is accomplished prior to attachment, the labels can be positioned in quick succession in the head and switch button 103 depressed. Prior to pressing 103, however, selector switch button 104 is set to engage the activate pattern of conductors in the head. If, on the other hand, we wish to deactivate the label, selector button 105 is set to engage the deactivate pattern of conductors. An internal mechanism (not shown) is provided to release 104 when 105 is engaged, and vice-versa. Means for doing this are well-known to the push-button art and need not be described here.

As is evident from the arrangement of FIG. 13, the label 40 can be positioned in one of two perpendicular directions. This permits a choice of which direction along the label the activation pattern is placed—parallel with the length of the label or the width. Again, the label can be positioned as shown, or turned oppositely. Too, the label can be positioned face up, as shown, or it can be positioned face down. Altogether, a choice of eight positions are provided. With the positions of activation and deactivation synchronized, a measure of security is provided against the possible collaboration of crooks inside an establishment with crooks outside. Unless the labels are identically positioned for activation and deactivation, the patterns wouldn't coincide so that an appropriate response would be made in an interrogation zone. The cutaway, 102, in the label, shows the continuation pattern of crosses, 101, under the label.

When labels can be accurately placed in such things as books, a reference frame comprised of frame members 106 and 107, which meet to form a right-angled corner, can be used. With this adaptation, the labels would be accurately attached to either the front or back covers at prescribed distances from one corner, and these distances would coincide with similar distances of the sensitive area, 100, from the reference frame corner provided by 106 and 107, so that when the book was appropriately positioned in the head, book label 40 and sensitive head area 100 would coincide. In a similar way, other goods can be packaged in cartons, boxes, plastic packages, etc., of fixed shapes, having labels in prescribed locations.

Figure 14A:
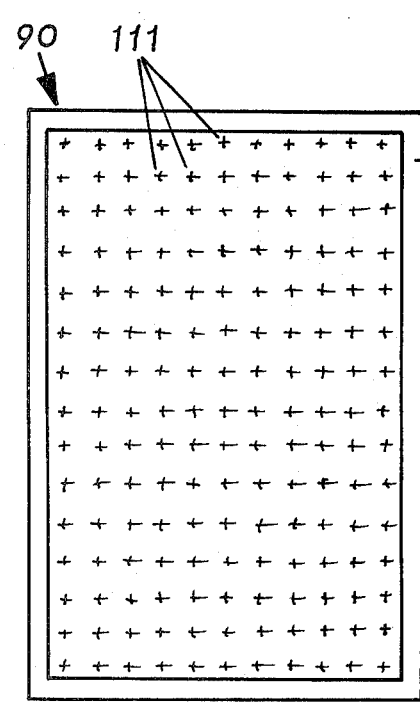
FIG. 14a is a plan view of a hand-operated, stamp-like head used to activate and deactivate memory labels.
Figure 14B:
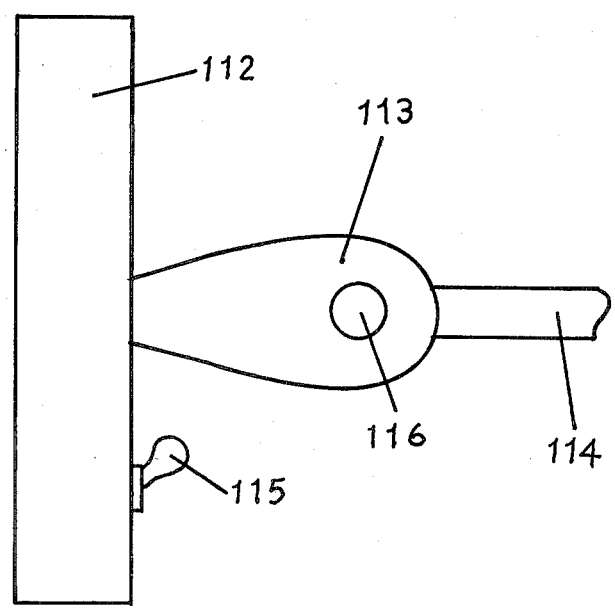

For less exacting applications, goods can be packaged in plastic bags or wrappings having visual memory element labels. Under this circumstance, a hand-operated stamp-like head, 90, as shown in FIGS. 14a and 14b, would be well suited. The crosses, 111, again show the locations of the sensitive spots; 112 is the frame of the hand-operated head, 113 is the handle and 114 is a cable of electrical conductors which conveys the necessary currents from auxiliary apparatus. 115 is the operating handle of a multi-position switch. In one position the conductors inside the head are connected for activation; in a second position, the conductors are set for deactivation. In use, the clerk-operator, having set switch 115 for the action to be taken, would locate 90 over the memory label 1, 40, or whatever, and press the operate button 116 with a finger. This type of apparatus is also adapted for use with unpackaged goods, such as articles of clothing, which have visible memory element labels.

While deactivation has been described above in terms of unidirectional pulses of current, the most effective means of deactivation is the application of alternating currents of appropriate frequencies and in envelopes of exponentially decreasing amplitudes. When deactivation is accomplished in this way, and the memory element labels can be accurately positioned, the activating sets of conductors are all that are necessary, and deactivation accomplished by applying the above specified alternating currents to them. When, however, the memory element labels cannot be accurately positioned with respect to the activate/deactivate head, it is desirable to use both sets of conductors and apply exponentially decreasing alternating currents of one frequency to one set of conductors, and simultaneously apply exponentially decreasing alternating currents of a slightly different frequency, or phase, to the other set of conductors. In this way we'd get a rotating pattern of deactivation so that it wouldn't matter particularly how skew, relatively, the placement of label and head might happen to be. The third position of switch 115, of hand-operated head 90, could, for example, be used to provide this arrangement of conductors and deactivating alternating currents. Similar arrangements could obviously be added to the head of FIG. 13.

As with all anti-pilfering systems, it is necessary to provide an interrogation zone and this is usually located in a doorway or in conjunction therewith. For purposes of this invention, this part of the apparatus is shown schematically by FIG. 16 where 161 is a frame through which customers pass and 162 is a loop of conductors supported by 161 and connected at junctions a,b to other portions of the apparatus. 163 is a signal generator wherein the various signal forms that are used originate. The wave forms that can be used are rectangular pulses of specified widths and repetition rates, sawtooth pulses, square waves and continuous sinusoidal waves. 164 is a power amplifier, likewise terminating into the junction a,b, and feeding power into loop 162 whereby the signals generated by 163 establish an adequate magnetic field within the doorway 160 and surrounding interrogation zone. 165 is a selectivity apparatus, which also is connected to loop 162 at a,b, and by means of which the signals produced in memory element labels by the magnetic field of the doorway, are selected from the primary power signals that are applied to loop 162, and from interfering noise that also might be found in the doorway and surrounding interrogation zone. The selectivity apparatus 165 passes the selected signals to amplifier 166, where the signal level is raised to a desired value, and passed to analyzing and registry apparatus 167. Several modes of operation are possible, a few of which will be described with the help of the graphs of FIGS. 18, 19, 20, and 21.

If the interrogating power, originating in 163 and applied to loop 162 by power amplifier 164, has the continuous square wave form of FIG. 18, and if memory element labels carried into the doorway are activated in the pattern of FIG. 6a, responses of the form of FIG. 19 will be produced, as best shown by making use of the hysteresis loops of FIG. 15. Suppose that the memory label has ferromagnetic substance described by the hysteresis loop 131, the activated rows of the label will be set at the retentivity point of the material, $B_r$. If the component of the magnetic field in the doorway, intercepted by the memory element, and produced by the positive half-cycle 181, is in a direction to drive the memory element back into, or toward, positive saturation in the direction of arrow 143, the response, 183, will be relatively small. On the other hand, the negative half-cycle response, 184, as produced by the pulse 182, will be relatively large because the memory element will be driven from $B_r$ in the direction of arrow 146 where a guided magnetic pathway of considerable length is available and where relatively large amounts of magnetic energy can be stored. It is the energy stored in the memory element that gives rise to the signal of FIG. 19 when it is released by reflex action of the ferromagnetic substance as it moves back to the stable minimum energy point, $B_r$, when the drive is removed or reverses polarity. Because energy is momentarily stored in the ferromagnetic memory substance, there is a phase delay of $T_2-T_1$ seconds in the response of FIG. 19 with reference to the driving wave of FIG. 18. If the driving wave of FIG. 18 is repeated and continuous, the signal response of FIG. 19 will also be repeated and continuous. If, on the other hand, the drive is a sequence of separated pulses, a sequence of separated pulses will be produced. In either case, the magnetic storage in the memory element label is read and appropriately analyzed by 167 in terms of how 167 has been programmed. In computer terminology, this is a quite typical non-destructive read-out of a memory element.

Because a great multiplicity of memory paths of long length are provided, the magnetic energy storage will be relatively large, as compared with an unprocessed ribbon of material, and the signal response, resulting therefrom, large. High level gates can then be set to distinguish these signals from the much smaller responses produced after the memory element label has been deactivated. Upon deactivation, each long magnetic path in the memory element is either completely destroyed or broken into a multiplicity of short, crooked paths and the effects obtained from long needle-like oriented magnetic domains lost. In other words, the magnetic moment of each long path has been destroyed. In addition thereto, the demagnetization polarizations of the simple do-system will add small signal components that were'nt there before. Making good use of the relative signal amplitudes, as well as the content of the signals, the two conditions of the memory element label can quite easily be distinguished—at least with the same accuracy that we read the "0" or "1" bits of a digital computer.

In addition to the foregoing deactivation procedures, the usual methods of de-magnetization can be applied; i.e., passing the goods, with labels attached, through exponentially decreasing alternating current magnetic fields. When this has been done, the previously activated memory element label is reduced to that of a relatively large single piece of material of a poor shape with magnetic domains oriented in a multiplicity of hit-and-miss directions. In this condition, it is a demonstrated fact that the response will be small and of a character that is different and distinguishable from the response obtained from long thin strips wherein the magnetic domains are mechanically oriented by the strip boundaries, or wherein the magnetic domains are oriented by the means disclosed in this invention.

Obviously, the ferromagnetic markers of systems presently in use, as represented by the patents referenced above, can be further improved by the methods and means of this invention. whereas, long ribbons of ferromagnetic material have been provided, the same can effectively be made even longer and thinner than they now are, or is mechanically practical, by applying the magnetic path division methods of this invention to them, and the signal levels now obtained from them raised accordingly. If the signals presently obtained are adequate, the power of the doorway can be appropriately reduced or other simplifications of apparatus and cost effected.

The alternating field demagnetization procedures above referenced can be applied in the usual ways, as by passing the goods with their memory labels attached through coils having alternating currents of appropriate frequency and amplitude flowing in them. In view of the fact that the tangential component of the magnetic field issuing from a conductor carrying electric current is utilized in this invention, another most convenient means of demagnetization becomes possible. Consider FIG. 17 which shows a screen of conductors, 170, comprised of a multiplicity of horizontal conductors 171 and a multiplicity of lateral conductors 172. The conductors 171 terminate in buses 175 and 176, and terminals 177 and 178, respectively, while the conductors 172 terminate in buses 173 and 174, and terminals 179 and 180, respectively. If alternating EMF's are applied to the pairs of terminals 177, 178 and 179, 180 currents will flow in conductors 171 and 172 and a tangential magnetic field established above and below the plane of the conductors. If goods, with memory labels attached, are placed on this screen and EMF's of appropriate frequencies and amplitudes applied to the terminal pairs 177, 178 and 179, 180, the magnetization can be completely removed from the memory labels. As before proposed, the most desirable arrangement is to apply slightly different frequencies, or phases, to the terminal pairs, start with amplitudes sufficient to drive labels into magnetic saturation, and decrease more-or-less exponentially to the vanishing point over quite a few cycles—say 100 to 1,000 cycles. Obviously, the higher the demagnetizing frequency, the less time is required in providing an appropriate decrease in magnitude; at the same time, the frequency must be low enough that skin-effect phenomena do not appreciably limit the depth of penetration of the magnetic field into the ferromagnetic substance that is employed.

While the magnetic field intensity above and below the screen will not be independent of the distance from the screen, as is true for the corresponding electric field intensity in the electrostatic case, the magnetic field intensity will not change rapidly for distances above and below the screen that are small compared with the dimensions of the screen. Thus, if the screen is hidden under a thinly-covered table top where goods are sold and packaged, as at a cashier's stand, and currents of two slightly different frequencies automatically driven through them in the required envelope patterns, the magnetizing activation of the memory labels attached to the goods will be cancelled without anyone knowing what has happened. The process in this instance is very similar to that of removing a recording from a magnetic tape. The only difference is that two frequencies are used and the dimensions have been scaled up considerably.

When a customer has paid for his goods at the above described counter, where the memory labels are cancelled, and carries it through the doorway 160, FIG. 16, nothing happens. When, however, a shoplifter carries stolen goods which haven't had memory labels cancelled at a cashier's desk, through 160, signals are generated in, and radiated from, the uncancelled labels, picked up in loop 162, selected in network 165, amplified in 166, analyzed in 167, registered in whatever manner programmed, and the shoplifter apprehended.

In the same way as above described for reading the magnetic activation of memory labels, 40, FIG. 6a, the memory labels, 60, of FIGS. 7a and 8 can be read by probing them with the square waves and pulses of FIG. 18. In this situation, however, we have both positively and negatively polarized storage grooves; consequently, if an equal number of positive and negative grooves have been provided, the positive and negative signal responses that are produced will be the same and an alternating signal, rich in harmonics, as shown in FIG. 20, will be produced. If we are phased as above described for FIG. 6a, the positive pulse 181, probing magnetic storage paths 74, FIG. 7a, will produce pulse responses such as 183, FIG. 19, and simultaneously therewith, pulse 181, probing magnetic storage paths 75, FIG. 7a, will produce pulse responses such as 184, FIG. 19. The only difference is that, in the latter instance we are operating from $-B_r$. Please note, however, that we are probing with forward going MMF's in both instances, and arrows 141 and 142 move magnetic flux in the same direction from $-B_r$, to produce large signal pulse responses, as did arrow 143 from $+B_r$, to produce small signal pulse responses. Accordingly, the small and large signal pulse responses will be phased to add, resulting in the elongated pulse 185, FIG. 20. Similar results will be obtained when the magnetic memory paths are probed by the pulse 182, FIG. 18, except that this time the combined signal pulse responses will be phased negatively, as 186, FIG. 20. If the probing pulses, 181 and 182, FIG. 18, are continuously and sequentially applied, the signal pulse responses will be continuously produced and received, and once more we have a good example of a continuous non-destructive read-out from a memory element. But this is by no means all that can, or will, happen as will be seen when we examine the magnetic storage pattern of FIG. 10 which results, as before described, when we add the magnetic continuation storage grooves, 95 and 96, FIG. 8, as produced by the circuitry of FIGS. 9a and 9b, to the straight line storage grooves 74 and 75, FIG. 8.

When the memory label 60', FIG. 10, is carried into an interrogating field and probed by the pulses of FIG. 18, much of the responses of memory label 60, FIG. 8, will be produced; i.e., the signal pulse responses of FIG. 20. But something else has been added. The positively directed magnetic grooves, 74, FIG. 8, have been joined by the negatively directed grooves, to form the enormously long folded continuous magnetic groove of FIG. 10. And while much, perhaps most, of the energy stored in this long groove by the probing pulses of the interrogating field will be radiated out as individual components in the manner previously described, to produce a pattern such as that of FIG. 20, some of the stored energy is bound to flow along the grooves, at least the amounts required to fill the curved portions at the ends, to be delivered later in the form of the pulse of FIG. 21. In other words, the magnetic domains which are moved by positive probing will be effected by the magnetic domains that are moved by negative probing, and vice-versa. The great importance of this is that the pulse 187, FIG. 21, overlaps at least one full cycle of the probing pulse of FIG. 18. In other words, the pulse of FIG. 21 will contain sub-harmonics of the pulse of FIG. 18. As far as it known, this is the first time such a result has ever been achieved. And since sub-harmonics are never found in nature, and are very difficult to produce, it is easy to see how valuable this result can become in anti-pilfering devices.

The sub-harmonic response can be further augmented if steps are excerised to make the total magnetic path of FIG. 10 some appropriate fraction of a wave length, as a quarter of a wavelength, or a half of a wave-length. The velocity of propagation of electromagnetic waves in free space is, of course, the velocity of light, c. In material media, however, the velocity is greatly reduced; indeed, the velocity of propagation is reduced by the factor.

$$\frac{c}{\sqrt{\mu k}}$$

where $\mu$ is the magnetic permeability, and K is the inductive capacity of the medium. Since our magnetic vector is confined to the plane of the memory element, and mostly to the lengthwise direction, we are concerned almost exclusively with the ferromagnetic substance and its close environs. Since also, the Poynting, or radiation, vector must be perpendicular to the plane of the memory element if energy escapes, or is radiated, therefrom, the electric vector must also be in the plane of the memory element and perpendicular to the magnetic vector, which is to say along with the width of the memory element.

Referring now to FIG. 2c, we can make 8 out of ferromagnetic material having a permeability of 100,000, and we can make 7 and 9 out of dielectric material, such as Titanium dioxide which has a dielectric constant of at least 100. In this way, we can provide a product $\mu K = 10^7$, or $\sqrt{\mu K} = 3.16 \times 10^3$. This means that the thirteen-line pattern of FIG. 10 which totals about a meter in actual length, and which in free space would be one wavelength for a frequency of 300 megahertz becomes a wavelength for 300/3.16 kilohertz, or 94.49 kilohertz. This is a frequency that falls within the range of what is presently practical in anti-pilfering devices of the type described in this invention.

With the folded magnetic groove length totalling a half-wave-length at half the probing frequency, where the impedance would be minimum, conditions would be ideal for radiating energy at this frequency as compared with the fundamental, or probing frequency, where the folded magnetic groove length would be a full wavelength and the impedance maximum. This type of radiation system is a little bit like a helical antenna although there are major differences. Whereas the helical antenna is fed from one end and radiates broadside, the magnetic memory label of this aspect of the invention is fed broadside, and radiates broadside but from a magnetic domain coordinated length; i.e., each of a multiplicity of straight line paths receive energy from the magnetic field of the doorway and, for the component of interest, give up energy along a coordinated length.

Perhaps another way of looking as it is that the memory label of FIG. 10 momentarily receives energy from the field faster than it can get rid of it so that the energy accumulates over a primary cycle, or two, until the label can hold no more, then the label delivers energy back to the field at some frequency most compatable with its construction, and this should be at some subharmonic frequency.

Considering the density of information on a magnetic tape recording, for example, it is clear that the line density illustrated in FIG. 10 is by no means the greatest density that can be obtained. As far as the ferromagnetic medium is concerned, the line density will be limited only by the cross-talk between lines; i.e., adjacent magnetic domain alignments affecting each other. From a practical manufacturing point-of-view, the line density will be limited by the conductor network dimensions required to produce it. In any event, perhaps at least ten times as many lines, or magnetic grooves, can be put in the same space shown by FIG. 10. If this can be done, the wavelength figure will be reduced by the same amount so that we could then get a total wavelength for the path at approximately 9.45 KHz.

In addition to reading the ferromagnetic memory label by means of the pulses, or square waves, of computer technology, it is of course possible to read the memory by means of continuous sinusoidal fields as is the practice of most anti-pilfering systems of the present day. To this end, 163, FIG. 16, would be a sinusoidal electric generator of any desired frequency, 164 would be a suitable power amplifier for the same, 165 would be an electronic filter of some sort, set to pass signals of the chosen frequencies, and exclude all others, 166 would be a suitable voltage amplifier and 167 would be the analytic network or register whereby the signals received and passed by 165 and 166 are analyzed, compared, observed, etc. and used to provoke a necessary action as determined by the circumstances. The harmonic content of the received signals, relative amplitudes of the odds and evens, etc., will be determined by the magnetic groove patterns of the labels presented in the doorway, and the relative amplitudes of the harmonics used to determine whether goods to which labels are attached arrive at the doorway as a legitimate transaction or not. But the use of distinguishing harmonics to separate the legitimate and illegitimate transactions becomes less of a necessity with the ferromagnetic memory labels of this invention because the magnetic energy storage and delivery has been so enormously multiplied as to make the relative overall signal amplitudes entirely adequate in separating the legitimate from the illegitimate transactions without reference to harmonics of one kind or another. In other words, the activated state of a label will produce signals so enormously greater than the inactivated, or crossactivated, states as to provide an adequate system on the basis of amplitude. This, too, we have not had before.

Referring again to FIGS. 16 and 16a, it is also possible to use the heterodyne methods of interrogation and signal separation with the labels of this invention as were provided by one of the above named references. To this end, we make 163 a generator of one frequency and 169 a generator of another frequency, with 164 and 168 being suitable power amplifiers in their respective channels, so that the magnetic interrogation fields are established simultaneously in the doorway. The labels being nonlinear devices, sum and difference frequencies will be produced and picked up by loop 162, selected by 165 and thereafter handled in the reception channel as required. As for other signal forms, the amplitudes of the sum and difference frequencies will be greatly increased by the memory labels of this invention, because the amounts of energy handled are greater.

With the exception of the exposition on the use of dielectric material in combination with magnetic material to provide wavelength type labels, we have, thus far, considered a ferromagnetic substance comprised of one material, or one layer, as shown in FIG. 2a. While this is entirely adequate for most applications, a further enhanced result can be achieved through the use of two layers of material, as shown in FIG. 2b, and as described by the hysteresis loops 131 and 132 of FIG. 15. The material of loop 131 has high permeability and low coercivity while the material of loop 132 has low permeability and high coercivity, as already noted. With suitable MMF's applied, the material of loop 131, under steady state conditions, will follow the arrows 142, 143, 144, 145, 146, 147, 148, 149, 150, and 141. With the MMF removed at points of positive or negative saturation, arrows 144 or 149, and in the absence of the material of loop 132, the material of loop 131 will fall back to the points of retentivity, $+B_r$ or $-B_r$, respectively. The coercive points for this material are $H_1$ and $H_3$.

For the material of loop 132, the hysterisis loop, under steady state conditions, is defined by the arrows 153, 144, 145, 154, 155, 156, 149, 150 and 151. Upon positive or negative saturation, and in the absence of the material of loop 131, the material of loop 132 will fall back to the retentivity points $+B_R$ and $-B_R$, respectively, when the saturating MMF is removed. The coercive points for this material are $H_2$ and $H_4$.

When both materials 131 and 132 are present together, and in intimate magnetic contact, the initial operating points for activated material won't, however, be any of the points of retentivity, $+B_r$, $-B_r$, $+B_R$, or $-B_R$. For example, with both materials at positive saturation, as depicted by arrow 144, and the saturating MMF removed, the material 131 won't move back to $B_r$, nor will the material 132 fall back to $B_R$. Rather, the high coercivity material will fall back to Y where it will drive negative flux through the low coercivity material to pin it at a new operating point Y'. In essence, 132 is a permanent magnet and 131 is its keeper. In this way, each magnetic groove of the high permeability material, 131, is available to receive doorway flux along an entire hysteresis length without running the risk of being destructively read. And when the doorway flux is removed, or goes into an opposing cycle, the entire length of groove, or that fraction of it used by doorway flux, gives up its momentarily stored energy and falls back to Y'. Destructive read out will happen only when the applied MMF of the doorway flux exceeds the coercive values $+H_2$ or $-H_4$, and as is readily evident by taking a quick look at FIG. 15, the doorway drive can ride around the entire hysteresis loop 131 without even exceeding these limits.

This operation is similar to that of a galvanometer coil operating in a very strong magnetic field. With current flowing in the galvanometer coil, the galvanometer needle rotates to a point defined by the current in the coil, the strength of the magnetic field, and the restoring force of the spring. With the current in the coil removed, the needle and coil to which it is attached gives up its energy and falls back to the zero position. And it is virtually impossible to put enough current through the galvanometer coil to de-magnetize the P.M. that produces the magnetic field in which the coil operates.

For oppositely polarized magnetic grooves, the operating line will be ZZ' on the opposite, the right-hand side of the graph. Otherwise, the action will be as above described. This combination of magnetic materials gives us the best in magnetic path orientation and definition: that which is provided in a material of large coercive force; and the best in signal response: that which is provided by a high permeability material. This response can, however, be doubled by putting a layer of high permeability material on each side of the high coercivity material, as illustrated in FIG. 2c.

While the methods and means above described for activating ferromagnetic memory labels, and as illustrated by FIGS. 6a, 6b, 7a, 7b, 9a and 9b, are entirely adequate, other means are of course possible. Three such are illustrated by FIGS. 22, 23, 24, 25, 26, and 27.

Figure 22:
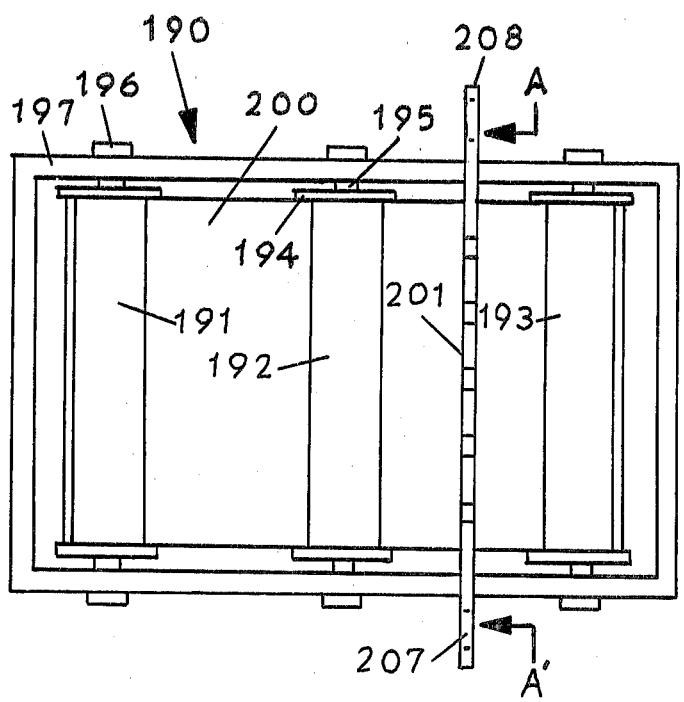
FIG. 22 is a drawing in plan view showing still another means of biasing or activating ferromagnetic memory labels.
Figure 23:
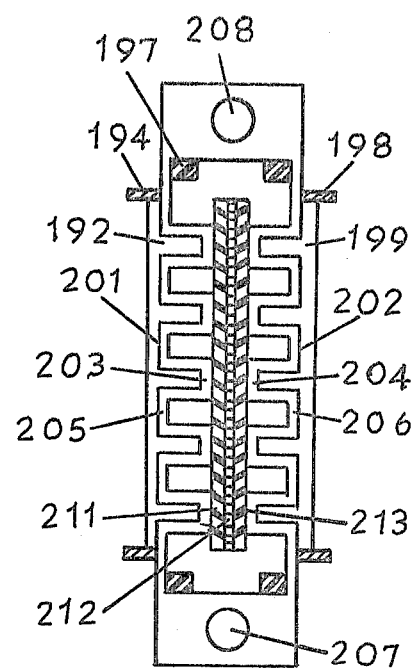
FIG. 23 is a cross-section of the apparatus of FIG. 22, at AA', showing one of two arrangements of the activating conductors.
Figure 24:
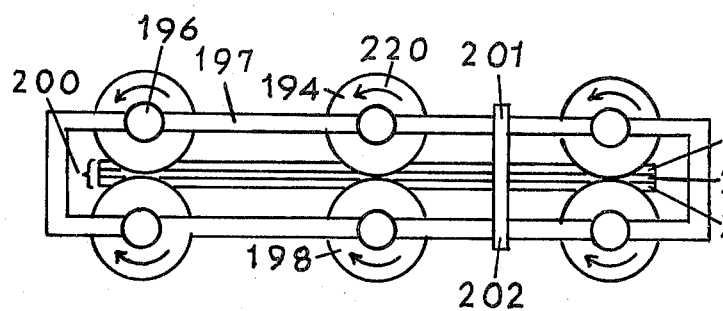
FIG. 24 is a side view, in elevation, of the apparatus of FIG. 22.

FIGS. 22, 23, and 24 show activation method and means, 190, for moving a ferromagnetic memory label 200 past two sets of conductors 201 and 202. One set, 201, is situated above the memory label 200, and the other set, 202, is situated below. Five conductor bends, or portions adjacent 200, typified by 203, are in contact alignment on top the label, and five conductor bends, or portions adjacent 200, typified by 204, are situated on the bottom, and these are separated and joined together by conductor portions remote from 200 and typified by 205 and 206, respectively. 211 and 213 are the outer non-magnetic layers of the memory label and 212 is the ferromagnetic layer. The thickness of the label is of course greatly exaggerated for illustrative purposes. In practice, each layer of the label will be only a few mils thick so that conductor portions adjacent the label, as 203 and 204, will set up strong magnetic fields in the label when current is passed through the conductors, as shown by FIG. 5 and Equation (1). Accordingly, as the label is moved past conductor sets 201 and 202, each of which carries at least half enough current to saturate the ferromagnetic layer 212, parallel paths of saturation will be established in the label. The conductor sets 201 and 202, FIG. 23, are connected in parallel and a suitable EMF applied to terminals 207 and 208. Thus, this arrangement of conductors and transport system to move the label, will produce the saturation flux pattern of FIG. 6a but has the additional advantage of not depending upon spontaneous domain alignment to make the paths continuous. Obviously, it doesn't matter whether the label moves with respect to fixed conductor sets, or whether the conductor sets move and the memory label remains fixed. The requirement is that the length, or width, of the label be traversed by magnetically segmented conductors carrying sufficient electric current to saturate the ferromagnetic substance adjacent each such segment. By magnetically segmented conductors in this application, I mean that arrangement of conductors having portions magnetically adjacent the memory label and portions magnetically remote therefrom, with said adjacent and remote portions generally alternating with each other. And by magnetically adjacent, I mean that the conductor is sufficiently close to the ferromagnetic substance that the tangential component of magnetic flux produced by current flowing in the conductor is sufficient to saturate the ferromagnetic substance. And by magnetically remote, I mean that the conductor is sufficiently far from the ferromagnetic substance as to be unable to saturate the ferromagnetic substance.

Referring to FIGS. 23, 23 and 24 for some of the construction details passed by in the foregoing, FIG. 22 is the plan view of the arrangement, FIG. 23 is a cross-section of FIG. 22, looking in at AA', and FIG. 24 is an elevation of the structure of FIG. 22. 197 refers to the entire structural framework of the device which, for simplicity, is made of electrically insulating material, such as plastic; otherwise, some means (not shown) must be taken to insulate the conductor sets 201 and 202 from the framework 197. These conductor sets are mechanically positioned and supported by the frame and electrically insulated therefrom, as noted, implicitly or explicitly as the case might be. 191, 192, and 193 are the top rollers of a set of six which hold the memory label 200 between them, and 198 is the central bottom roller. One, or more, pairs of these rollers are put in circular motion as indicated by the arrow 220, by means not shown, so that the memory label 200 is driven past the conductor sets 201 and 202. The rollers are equipped with flanges, such as 194 and 198, so that the memory label is guided by the edges as it is transported. 195 is a typical shaft by means of which each roller is supported in the frame 197, and 196 is a typical hub cap.

Figure 25:
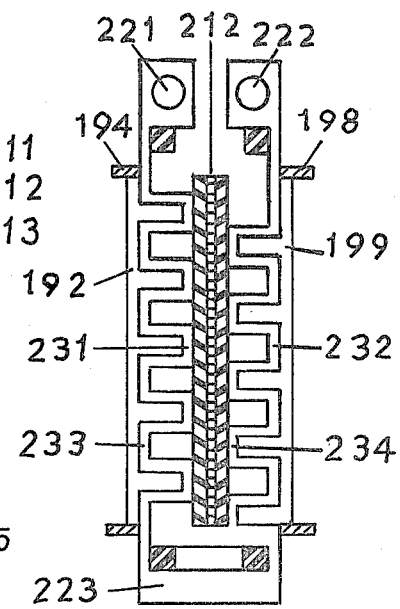
FIG. 25 is a cross-section of the apparatus of FIG. 22, at AA', showing an alternative arrangement of activating conductors.

FIG. 25 is an alternate cross-section across AA' showing a variation of the conductor set patterns whereby memory paths of the form of FIGS. 7a and 8 are produced by means of the transport system and associated apparatus. In this variation, the conductor sets are connected in series by means of the conducting bridge 223, and the application of a suitable EMF at terminals 221 and 222 on the opposite end. Also, one set of magnetically segmented conductors is arranged differently. The adjacent segments, as 231, on one side of the memory label are opposite the remote segments, as 232, on the other side of the label, and vice-versa for 233 and 234. In this arrangement, each conductor segment carries enough electric current to saturate the ferromagnetic substance of the label, as compared with half enough in the arrangement of FIG. 23. Since the currents in one set of conductors, on one side of the label, flow in opposite directions to the currents in the other set of conductors, on the opposite side of the label, alternate paths of magnetic saturation will be set up in the label, as in FIGS. 7a and 8.

Figure 26:
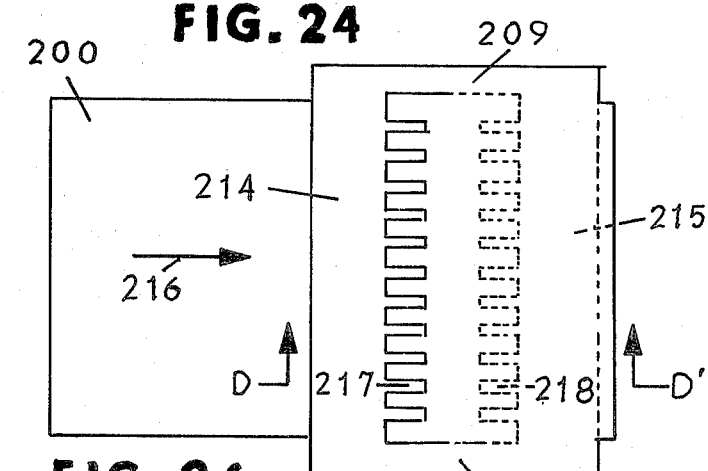
FIG. 26 is a drawing in plan view which, in conjunction with FIG. 22, shows a magnet means of biasing or activating ferromagnetic memory labels.
Figure 27:
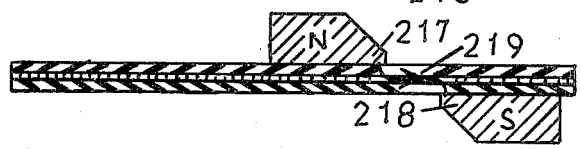
FIG. 27 is a cross-section of FIG. 26, at DD', showing the arrangement of magnetic poles in relation to the ferromagnetic memory label which they activate.

FIGS. 26 and 27 show how a set of magnets, permanent or electro-, can be used in a transport system to set up lines of magnetic saturation in a memory label. We'll assume that the transport system of FIGS. 22 and 24, or the equivalent thereof, is used, and that the framework, 197, of the transport system, supports and positions the system of magnets with respect to the memory label 200. In the simplest arrangement, each of the teeth, as 217 and 218, are little P.M's. which are set into the yokes 214 and 215. The 217 P.M's. have North poles protruding and are arranged above the memory label, while the 218 P.M's. have South poles protruding and are arranged below the memory label with a short displacement parallel with the label. Thus, in the gap between pole teeth, magnetic flux will flow through the ferromagnetic substance of the label, as shown by the arrow 219, and if of sufficient strength will saturate the ferromagnetic substance between each pair of pole teeth so that as the memory label is transported past the teeth saturation lines, and domain alignment, will be established in the ferromagnetic substance of the memory label.

End yokes, 209 and 210, not shown in complete detail, provide for the flow of return flux. Suffice it to say, for the purpose of this invention, that these yokes pass diagonally across each end.

If we wish parallel lines of saturation, all flowing in one direction, as in FIG. 6a, we cause all of the poles of one set of magnet teeth, on one side of the card, to have the same polarity, and the set of magnet teeth, on the other side of the card, to have the opposite polarity. As already stated, we can use individual P.M. teeth; alternatively, we can place P.M's. in each of the yokes, 209 and 210, with the poles of both set in the same direction.

On the other hand, if we wish to establish alternating lines of magnetic saturation and domain alignment, as in FIGS. 7a and 8, we alternate the magnetic poles on each side of the memory label and arrange it so that a North pole on one side of the label is opposite a South pole on the other side of the label. We also design to have our pole spacings such that the separation of poles on each side of the label is great compared with pole separations through the label. Considering that the drawing views greatly exaggerate some dimensions, so that the principles of the invention can be clearly seen, this can quite easily be done. The memory label is only a few mils thick, as before stated, and the tooth staggering on opposite sides of the label need not be more than a few mils, it is quite possible to have adjacent pole teeth on each side of the label at least ten times further apart than are pole teeth through the label.

To employ electromagnetic techniques in each instance, we can appropriately apply electrical windings to the magnet system, in each instance, the entire structure of each of which is now made out of soft ferromagnetic material. For the parallel line case of FIG. 6a, we simply put electrical windings around each of the yokes 209 and 210, and direct the currents in each winding to produce opposing magnetic fields. For the series case of FIGS. 7a and 8, we are obliged to put windings around the individual teeth much like we would wind an electric motor. This can be done in honeycomb, ring-around-the-rosy fashion, or individual coils can be placed around each tooth and connected externally to provide the desired polarities, as given above for the P.M. case.

What is claimed is:

1. An electronic status determining system for goods comprised of more than one substantially identical apparatuses each of which includes, in combination, means for producing no more than two magnetic states in a ferromagnetic memory label, means for altering the state produced, means for determining the state that has been produced, means for storing information, means for programming said stored information, energizing means, and alarm sounding means;

Said means for storing information comprised of two portions:
   A first portion of which is stored within each of said apparatuses in the form of instructions;
   A second portion of which is not contained in any of said apparatuses and is comprised of a multiplicity of ferromagnetic memory labels attached to said goods and controlled by an agency responsible for said goods, and by customers of said agency;
   Said goods, with labels attached, from time to time carried by said customers through said means for altering the magnetic state produced, and through said means for determining the state that has been produced;
   Each of said labels comprised of parallel sheet members in close proximity to each other, at least one of said sheet members comprised of ferromagnetic substance;
   Said means for producing no more than two magnetic states in said memory labels comprising means which produce a multiplicity of long lines of magnetic saturation in said ferromagnetic substance, said lines of magnetic saturation running substantially the full length of said memory labels and parallel to each other.

2. An electronic status determining system for goods, as in claim 1, said sheet member of ferromagnetic substance comprised of two thin sheets of ferromagnetic material in contact with each other, one of said thin sheets composed of ferromagnetic material having a wide hysteresis loop and large coercive force, and the highest residual magnetism consistent therewith, the second of said thin sheets comprised of ferromagnetic material having a narrow hysteresis loop, a small coercive force and high permeability.

3. An electronic status determining system for goods, as in claim 1, said means for determining the state that has been produced comprised of a doorway through which said customers and said goods with said ferromagnetic memory labels attached must pass, said doorway having a loop of electric conductors surrounding it, said loop energized by a sequence of electric current pulses which establish a pulsating magnetic field of energy in said doorway, some of said energy intercepted by said ferromagnetic labels, momentarily stored in said labels, radiated by said labels, picked up by said loop of conductors and fed to selectivity, amplifying and analysis apparatus which is connected to said loop.

4. An electronic status determining system for goods, as in claim 1, said means for producing no more than two magnetic states in a ferromagnetic memory label comprised of rows of electric current conductors in close proximity to said ferromagnetic memory labels and spaced an assigned distance apart, said conductors carrying electric current which produces a magnetic field about said conductors, tangential components of which pass through said ferromagnetic memory labels.

5. An electronic status determining system for goods, as in claim 4, said rows of conductors formed to make portions adjacent said memory labels and portions remote from said memory labels, said portions arranged and connected substantially in parallel lines.

6. An electronic status determining system for goods, as in claim 4, said rows of electric conductors divided into two parts, a first part of which consists of rows of equally-spaced conductors running substantially parallel with the length dimension of said label, a second part of which consists or rows of equally-spaced conductors substantially perpendicular to said conductors of said first part, said system including selective switching means whereby an electromotive force can be connected to either or both of said two parts of conductors.

7. An electronic status determining system for goods, as in claim 1, said means for producing no more than two magnetic states in a ferromagnetic memory label comprising a transport apparatus for said memory labels consisting of a framework supporting pairs of rollers and a means of magnetically saturating said labels at fixed intervals, said pairs of rollers disposed to move said memory labels past said means of magnetically saturating said labels and forming parallel lines of magnetic saturation in said labels.

8. An electronic status determining system for goods, as in claim 7, said means of magnetically saturating said memory labels comprising a set of electrical conductors having spaced portions in magnetic proximity to said memory labels and adjoining portions magnetically remote therefrom, said portions joined together by other portions whose magnetic field is substantially at right angles to the field of said proximity and remote portions, said set of electrical conductors having electrical currents flowing therein of magnitude sufficient to magnetically saturate said memory labels in spots directly beneath the conductor portions in magnetic proximity to said memory labels.

9. An electronic status determining system for goods, as in claim 7, said means of magnetically saturating said memory labels at fixed intervals comprising sets of magnets above and below said label, adjacent thereto and slightly displaced from each other along lines parallel with the plane of said label, parallel with the direction of motion of said label by said transport system, and in a direction that increases the gap between said sets of magnets above and below said label.

10. An electronic status determining system for goods, as in claim 9, said sets of magnets comprising thin permanent magnets substantially in the shape of parallelepipeds, magnetized along their lengths and set at intervals in soft ferromagnetic yokes above and below said label, with said yokes above and below said label magnetically connected by other soft ferromagnetic yokes disposed diagonally across both ends of said yokes above and below said label.

11. An electronic status determining system for goods, as in claim 7, said means of magnetically saturating said memory labels at fixed intervals comprising soft ferromagnetic pole pieces disposed above and below said label and slightly displaced from each other along a line parallel with the plane of said label, parallel with the direction of motion of said label, and in a direction that increases the gap between said pole pieces, said pole pieces above and below said label terminated by teeth at spaced intervals, the end portions of which are in intimate contact with said label, said teeth above and below said label disposed in facing alignment with each other, said pole pieces magnetically joined together across each end by soft ferromagnetic yokes, said pole pieces and yokes provided with means of establishing magnetomotive forces through the system.

12. An electronic status determining system for goods, as in claim 11, said means of establishing magnetomotive forces throughout the system comprising a division of said yokes into two substantially equal parts with permanent magnets placed between each of said divisions, said magnets polarized in opposition to each other.

13. An electronic staatus determining system for goods, as in claim 11, said means of establishing a magnetomotive force throughout the system comprising electrically conducting coils of wire around each of said yokes, said coils connected in magnetic opposition and suitably energized with an electromotive force.

14. An electronic status determining system for goods, as in claim 1, said means for altering the magnetic state produced comprising a screen of electrical conductors in two insulated sets, a first set of which consists of a multiplicity of closely spaced substantially parallel conductors, a second set of which consists of a multiplicity of closely spaced conductors which are substantially perpendicular to the conductors of said first set, said conductor sets connected to alternating current electric genertors.

15. An electronic status determining system for goods, as in claim 14, said alternating current generators modulated to periodically start at levels sufficiently high to saturate said memory labels and from these levels fall exponentially to vanishingly small levels over periods of time covering a substantial number of cycles of the alternating currents supplied by said generators.

16. A method of preparing a ferromagnetic memory label and determining the status thereof consisting of the steps of:
Providing a multiplicity of lines of magnetic saturation in said label;
Providing a check-out stand where said lines of magnetic saturation can be removed;
Presenting the label, attached to goods, in a zone that is energized by a varying magnetic field whose amplitude is a fundamental function of time;
Intercepting and momentarily utilizing said lines of magnetic saturation in said label to store some of said energy of said magnetic field;
Radiating said stored energy back into said zone;
Picking up said radiated energy;
Selecting components of said picked-up energy;
Amplifying said selected components;
Comparing and analyzing said amplified components to determine the status thereof;
Informing personnel of the determined status; and
Operating other apparatus.

17. A method of preparing a ferromagnetic memory label and determining the status thereof, as in claim 16, wherein the step of providing a multiplicity of lines of magnetic saturation provide lines all of which have the same polarity.

18. A method of preparing a ferromagnetic memory label and determining the status thereof, as in claim 16, wherein the step of providing a multiplicity of lines of magnetic saturation provide lines which alternate in polarity.

19. A method of preparing a ferromagnetic memory label and determining the status thereof, as in claim 18, wherein the lines of magnetic saturation are connected at alternate ends, by short lines of magnetic saturation which are substantially perpendicular to said alternate in polarity lines, to form one continuous folded path of magnetic saturation.

* * * * *